(12) United States Patent
Li et al.

(10) Patent No.: US 12,476,458 B1
(45) Date of Patent: Nov. 18, 2025

(54) GENERALIZED ENERGY STORAGE CONTROL METHOD AND SYSTEM FOR FULL CONSUMPTION OF DISTRIBUTED RENEWABLE ENERGY IN DISTRIBUTION NETWORKS

(71) Applicant: HUNAN UNIVERSITY, Changsha (CN)

(72) Inventors: Jiayong Li, Changsha (CN); Hengxi Liu, Changsha (CN); Mengwei Zhang, Changsha (CN); Cong Zhang, Changsha (CN); Lipeng Zhu, Changsha (CN); Zhikang Shuai, Changsha (CN)

(73) Assignee: HUNAN UNIVERSITY, Hunan (CN)

( * ) Notice: Subject to any disclaimer, the term of this patent is extended or adjusted under 35 U.S.C. 154(b) by 0 days.

(21) Appl. No.: 19/273,271

(22) Filed: Jul. 18, 2025

(30) Foreign Application Priority Data

Jul. 18, 2024 (CN) .......................... 202410966138.0

(51) Int. Cl.
*H02J 3/00* (2006.01)

(52) U.S. Cl.
CPC ............. *H02J 3/00* (2013.01); *H02J 2203/20* (2020.01)

(58) Field of Classification Search
CPC ............................... H02J 3/00; H02J 2203/20
See application file for complete search history.

(56) References Cited

U.S. PATENT DOCUMENTS

2016/0377306 A1* 12/2016 Drees .................... H02J 3/28
 700/295
2017/0102162 A1* 4/2017 Drees ..................... F24F 11/523
(Continued)

FOREIGN PATENT DOCUMENTS

CN 113780622 A 12/2021
CN 116961044 A 10/2023
(Continued)

OTHER PUBLICATIONS

Fang Jicheng, Research on Key Technologies of Energy Storage System Participating in Ancillary Service of Power System, Southeast University, 2022, pp. 1-115.

*Primary Examiner* — Ziaul Karim
(74) *Attorney, Agent, or Firm* — Ming Jiang; OPENPTO US LLC

(57) ABSTRACT

The provided is a generalized energy storage control method and system. The method includes: Acquiring a pre-established energy storage control model, where the energy storage control model includes an scheduling objective expression and power system constraints corresponding to the objective scheduling expression; Determining control parameters of the energy storage aggregation system based on the power system constraints and the objective scheduling expression; Determining an aggregated output curve of the energy storage aggregation system according to the control parameters, where the aggregated output curve characterizes the power output variation along time; Decomposing the aggregated output curve to obtain a respective decomposed output curve for each individual energy storage system within the energy storage aggregation system; Operating each energy storage system in accordance with its respective decomposed output curve. This method improves the operational security and reliability of the power system.

8 Claims, 10 Drawing Sheets

(56) References Cited

U.S. PATENT DOCUMENTS

| | | | |
|---|---|---|---|
| 2017/0103483 A1* | 4/2017 | Drees | G06Q 10/06315 |
| 2019/0181641 A1 | 6/2019 | de Hoog et al. | |
| 2019/0206000 A1* | 7/2019 | ElBsat | H02J 3/381 |
| 2019/0222024 A1* | 7/2019 | Vanouni | H02J 3/14 |
| 2024/0222974 A1* | 7/2024 | Hu | H02J 3/241 |

FOREIGN PATENT DOCUMENTS

| | | |
|---|---|---|
| CN | 117217841 A | 12/2023 |
| CN | 117559546 A | 2/2024 |
| WO | 2024043881 A1 | 2/2024 |

* cited by examiner

GENERALIZED ENERGY STORAGE CONTROL METHOD AND SYSTEM FOR FULL CONSUMPTION OF DISTRIBUTED RENEWABLE ENERGY IN DISTRIBUTION NETWORKS

CROSS-REFERENCE TO THE RELATED APPLICATIONS

This application is based upon and claims priority to Chinese Patent Application No. 202410966138.0, filed on Jul. 18, 2024, the entire contents of which are incorporated herein by reference.

TECHNICAL FIELD

The present application relates to the technical field of power systems, and particularly to a generalized energy storage control method and system for full consumption of distribution renewable energy in distribution networks.

BACKGROUND

With the continuous evolution of new-type power systems, an increasing amount of renewable energy, such as photovoltaic (PV) and wind power, is being integrated into smart grids. At the same time, smart grids are placing higher demands on the secure and reliable grid connection and efficient consumption of massive renewable energy. As an essential energy regulation unit of distributed energy resources, energy storage is playing an increasingly prominent role in the management, dispatch, and optimization of new-type power systems. Therefore, it is necessary to further tap into energy storage resources to support efficient consumption of renewable energy, enhance power grid security and reliability, and ensure the sustainable development of new-type power systems.

In recent years, as the penetration rate of distributed energy in distribution networks continues to rise, a large number of DGES (Distributed Generalized Energy Storage) resources have emerged on the user side, including battery energy storage systems, electric vehicles, thermostatically controlled loads, and telecommunication base stations. These resources hold substantial potential for flexible regulation.

However, due to the small power and capacity, as well as the large quantity of each type of generalized energy storage resource, it becomes extremely complex—and almost impractical—to centrally schedule these resources in a unified manner. Therefore, how to reasonably allocate and utilize a large number of generalized energy storage resources has become an urgent technical problem to be solved.

SUMMARY

In view of the above technical issues, it is necessary to provide a generalized energy storage control method and system for full consumption of distributed renewable energy in distribution networks. This solution determines the decomposed output curve of each individual energy storage system, thereby enabling the efficient utilization of distributed renewable energy, reducing the impact of renewable generation fluctuations on the power grid, and improving the security and stability of the power system.

According to a first aspect, the present application provides a generalized energy storage control method for full consumption of renewable energy in distribution networks. The method comprises:

Acquiring a pre-established energy storage control model, wherein the energy storage control model includes a target scheduling expression and the power constraints corresponding to the target scheduling expression;

Based on the power constraints and the target scheduling expression, obtaining control parameters of the energy storage aggregation system;

According to the control parameters of the energy storage aggregation system, determining an aggregated output curve of the energy storage aggregation system, the aggregated output curve being a fitted curve characterizing the relationship between the output and time of the energy storage aggregation system;

Decomposing the aggregated output curve to determine the decomposed output curve of each individual energy storage system within the energy storage aggregation system; each energy storage system outputs according to its respective decomposed output curve.

According to a second aspect, the present application further provides a generalized energy storage control system for full consumption of renewable energy in distribution networks. The system comprises:

An acquisition module, configured to acquire a pre-established energy storage control model, the model including a target scheduling expression and the corresponding power constraints; wherein the target scheduling expression is a model used to determine the output parameters of the energy storage aggregation system;

A processing module, configured to obtain control parameters of the energy storage aggregation system based on the power constraints and the target scheduling expression;

A curve determination module, configured to determine an aggregated output curve of the energy storage aggregation system based on the control parameters; the aggregated output curve being a curve representing the fitted relationship between the output of the energy storage aggregation system and time;

A decomposition module, configured to decompose the aggregated output curve to determine the decomposed output curve of each energy storage system in the energy storage aggregation system; each energy storage system outputs according to its respective decomposed output curve.

According to a third aspect, the present application also provides a computing device. The computing device comprises a memory and a processor, wherein the memory stores a computer program, and the processor executes the computer program to implement the steps of the aforementioned generalized energy storage control method.

According to a fourth aspect, the present application also provides a computer-readable storage medium. The computer-readable storage medium stores a computer program, which, when executed by a processor, implements the steps of the aforementioned generalized energy storage control method.

According to a fifth aspect, the present application also provides a computer program product. The computer program product includes a computer program, which, when executed by a processor, implements the steps of the aforementioned generalized energy storage control method.

The aforementioned generalized energy storage control method and system for full consumption of distributed renewable energy in distribution networks acquires a pre-established energy storage control model comprising a target scheduling expression and corresponding power constraints. By solving the power constraints and target scheduling expression, the control parameters of the energy storage aggregation system can be obtained. Based on these control parameters, the aggregated output curve of the energy storage aggregation system is determined. Subsequently, this aggregated output curve is decomposed to derive the decomposed output curves for each individual energy storage system. Each energy storage system outputs according to its own decomposed output curve, thereby achieving efficient utilization of distributed renewable energy, reducing the impact of renewable generation fluctuations on the grid, and enhancing the security and stability of the power system.

BRIEF DESCRIPTION OF THE DRAWINGS

FIG. 6A illustrates the curve under the WU method, and FIG. 6B illustrates the curves under the HS, RO, and SP methods;

FIG. 7A, FIG. 7B, FIG. 7C, and FIG. 7D respectively correspond to the WU, SP, RO, and HS methods;

FIG. 9A and FIG. 9B respectively show the real-time power adjustment distribution of AESS5 and AESS9 at time t=8.

DETAILED DESCRIPTION OF THE EMBODIMENTS

To make the objectives, technical solutions, and advantages of the present application clearer, the following provides a more detailed description of the present application with reference to the accompanying drawings and embodiments. It should be understood that the specific embodiments described herein are merely intended to illustrate the present application and are not to be construed as limiting.

The generalized energy storage control method for full consumption of renewable energy in a distribution network provided by the embodiments of the present application can be applied in a generalized energy storage control system aimed at fully consuming renewable energy in the distribution network. This system may be deployed on a computing device, which can be a terminal or a server. The terminal may include, but is not limited to, various personal computers, laptop computers, smartphones, tablet computers, Internet of Things (IoT) devices, and portable wearable devices. The IoT devices may include smart speakers, smart TVs, smart air conditioners, and smart in-vehicle systems. The wearable devices may include smartwatches, smart bracelets, head-mounted devices, etc. The server may be implemented as a standalone server or a server cluster composed of multiple servers.

Figure 1:
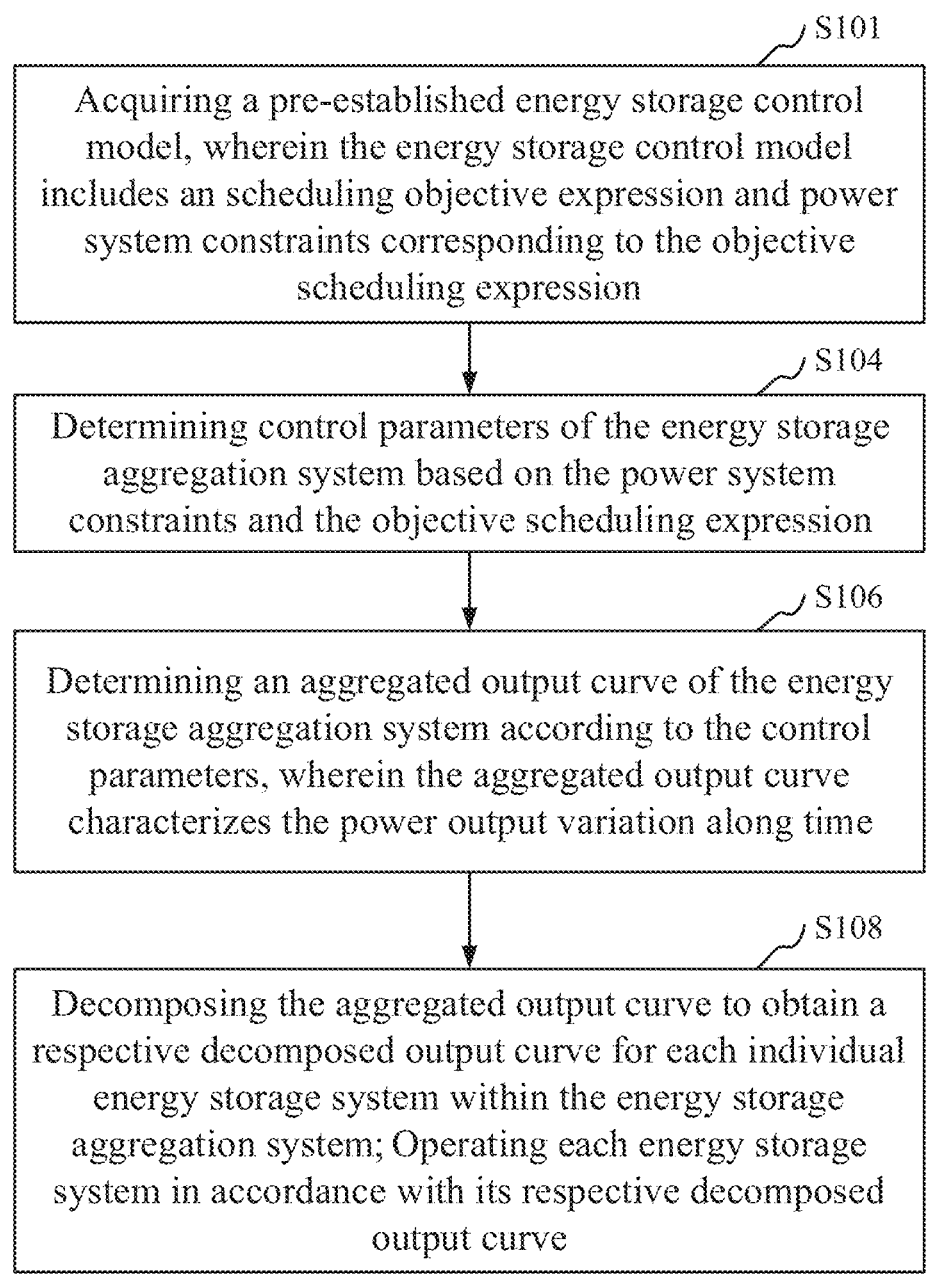
FIG. 1 is a schematic flowchart of a generalized energy storage control method for full consumption of distributed renewable energy in a distribution network according to one embodiment.

In one embodiment, as illustrated in FIG. 1, a generalized energy storage control method for full consumption of distributed renewable energy in a distribution network is provided. Taking the application of this method in a generalized energy storage control system as an example, where the system is deployed on a computing device, the method includes the following steps:

Step 102: Acquire a pre-constructed energy storage control model on the computing platform (in this embodiment, a personal computer running MATLAB 2020a may be used). The energy storage control model includes a target scheduling expression and power system constraints corresponding to the target scheduling expression.

The energy storage control model is constructed for a power system with the objective of minimizing the total expected operational cost of the system. The target scheduling expression refers to an objective function formulated to minimize the total expected operational cost. The power system constraints are flow constraints designed to ensure the stability and safety of the power system. When solving the target scheduling expression, the power system constraints are treated as hard constraints.

In some embodiments, the method of determining the energy storage control model includes the following: Based on the expected costs of electricity purchase/sale in the distribution network and the expected power regulation cost of the aggregated energy storage system, an initial scheduling expression is determined. The electricity purchase/sale cost is determined by the main grid purchase price, sale price, and purchase quantity. The expected power regulation cost is determined by the regulation cost coefficient and the output power of the aggregated energy storage system. According to the operational safety constraints of the distribution network, operational constraints of the aggregated energy storage system, and reactive power output constraints of wind and photovoltaic resources, the power system constraints corresponding to the initial expression are determined. The energy storage control model is then determined through equivalent transformation based on the initial scheduling expression and its corresponding power system constraints.

Specifically, the initial scheduling expression refers to an objective function constructed to minimize the total expected operational cost, including both the electricity purchase/sale cost of the distribution network and the expected power regulation cost of the aggregated energy storage system.

In some embodiments, the objective function expression is as follows:

$$\min F = F^B + F^{AESS} \quad (1)$$

$$F^B = \sum_{t \in T} E[\lambda_t^b (P_{0,t})^+ - \lambda_t^s (-P_{0,t})^+] \quad (2)$$

$$F^{AESS} = \sum_{t \in T} \sum_{i \in N_e} E[\lambda_t^e |p_{i,t}^{AESS}|] \quad (3)$$

In the objective function, min F denotes the minimization of the total expected operational cost. $F^B$ represents the expected cost of electricity purchase and sale in the distribution network from the main grid, i.e., the electricity purchase/sale expected cost. $F^{AESS}$ denotes the expected cost of power regulation by the generalized energy storage aggregator, i.e., the expected power regulation cost of the aggregated energy storage system.

$\lambda_t^b$ and $\lambda_t^s$ represent the electricity purchase price and electricity sale price from/to the main grid at time t, respectively $\lambda_t^e$ denotes the regulation cost coefficient of the generalized energy storage aggregator. $P_{0,t}$ represents the electricity purchased from the main grid at time t;

$p_{i,t}^{AESS}$ denotes the output power of the generalized energy storage aggregator i at time t. $(P_{0,t})^+ = \max(P_{0,t}, 0)$ denotes the larger of $P_{0,t}$ and 0. $T::=[1, 2, \cdots T]$ represents the set of time periods. $N_e:=[1, 2, \cdots, N_e]$ denotes the set of aggregated energy storage systems (AESSs), and $N_e$ is the number of AESSs.

In some embodiments, the power system constraints include distribution network operational safety constraints, operational constraints of the aggregated energy storage system, and reactive power output constraints of wind and photovoltaic (PV) systems. The distribution network operational safety constraints are as follows:

$$P_t = A^{-T} p_t \quad (4)$$

$$Q_t = A^{-T} q_t \quad (5)$$

$$V_t = R p_t + X q_t + V_0 1_N \quad (6)$$

$$\underline{V} \leq V_t \leq \overline{V} \quad (7)$$

$$a_k P_t + b_k Q_t \leq c_k \overline{S} \forall k \in K \quad (8)$$

Equations (4) and (5) represent the active power and reactive power balance constraints at each node in the distribution network, respectively. $P_t$ and $Q_t$ denote the active and reactive power flows on the distribution lines, respectively. $p_t$ and $q_t$ denote the active and reactive power injections at the nodes, respectively. A represents the node-to-branch incidence matrix, indicating the connection relationships between nodes and lines. Equations (6) and (7) express the voltage constraints at the distribution network nodes, where $V_t$ represents the voltage magnitude at each node; $\overline{V}$ and $\underline{V}$ are the upper and lower bounds of permissible voltage magnitudes, respectively. $R = A^{-1} D_r A^{-T}$, $X = A^{-1} D_x A^{-T}$, $D_r$ and $D_x$ are diagonal matrices composed of line resistances and reactances. $V_0$ denotes the voltage magnitude at the reference (slack) node, typically the substation node. $1_N$ is an N×1 vector with all elements equal to one, where N represents the number of nodes excluding the slack node. Equation (8) defines the power transmission constraint of distribution lines: $a_k$, $b_k$ and $c_k$ denote the linearized power flow coefficients. S is the maximum allowable apparent power on line. $K = \{1, 2, \cdots 8\}$, and $P_t$, $Q_t$, $V_t$, $\overline{S}, \overline{V}, \underline{V} \in \square^{N \times 1}$, N denotes the number of nodes excluding the slack node (node 0).

The expressions for active and reactive power injections at the nodes are defined as follows:

$$p_t = p_t^u + p_t^c \quad (9)$$

$$p_t^u = -p_t^d + G_{wp} p_t^{wp} + G_{pv} p_t^{pv} = r_t + G_t \delta_t \quad (10)$$

$$p_t^c = -B p_t^{AESS} = -B(e_t + D_t \delta_t) \quad (11)$$

$$q_t = -q_t^d + G_{wp} q_t^{wp} + G_{pv} q_t^{pv} \quad (12)$$

In the above expressions:

$p_t^u$ and $p_t^c$ denote the uncontrollable and controllable active power injections, respectively. The uncontrollable active power injection includes: nodal active load $p_t^d$, wind power active output $p_t^{wp}$ and photovoltaic active output $p_t^{pv}$.

The controllable active power injection refers to the nodal output power of the AESS $p_t^{AESS} \cdot q_t^d, q_t^{wp}$ and $q_t^{pv}$ denote the reactive power load, reactive power output of wind units, and reactive power output of PV units, respectively. $G_{wp}$, $G_{pv}$, and B represent the node-to-unit incidence matrices for wind power units, PV units, and AESS, respectively. $r_t$ denotes the baseline value of uncontrollable active power injection. $\delta_t$ denotes the forecast error of wind and PV active power outputs, and $\delta_t$ belongs to the set $\Delta_t := \{\delta_t | L_t \delta_t \leq h_t\}$, $\delta_t \in \square^{N_\delta \times 1}$, $L_t \in \square^{2N_\delta \times N_\delta}$, $h_t \in \square^{2N_\delta \times 1}$. $G_t$ is the incidence matrix corresponding to nodes affected by the forecast error. $e_t$ denotes the baseline of controllable active power injection, i.e., the baseline AESS output power. $D_t$ is the real-time power adjustment distribution factor matrix for AESS, which allocates adjustment quantities based on forecast errors. $D_t\delta_t$ denotes the real-time power adjustment performed by AESS in response to wind and PV forecast errors, thereby ensuring full consumption of wind and PV generation. $D_t$ satisfies the following form:

$$D_t = \begin{bmatrix} d_{11,t} & d_{12,t} & \cdots & d_{1N_\delta,t} \\ d_{21,t} & d_{22,t} & \cdots & d_{2N_\delta,t} \\ \vdots & \vdots & \ddots & \vdots \\ d_{N_e 1,t} & d_{N_e,t} & \vdots & d_{N_e N_\delta,t} \end{bmatrix} \quad (13)$$

$$0 \leq d_{jk,t} \leq 1, \sum_{j\in N_e} d_{jk,t} = 1, \forall j \in N_e, k \in N_\delta \quad (14)$$

In the above expression: $d_{jk,t}$ denotes the power adjustment allocation factor of the j-th AESS corresponding to the k-th forecast error at time t. $N_e:=[1, 2, \cdots, N_e]$ represents the set of AESS units, and $N_\delta$ denotes the number of AESS units. $N_\delta:=[1, 2, \cdots, N_\delta]$ represents the set of forecast errors, and $N_\delta$ denotes the number of forecast error sources. Therefore, the real-time power adjustment $$\Delta p_{j,t}^{AESS}$$

performed by the j-th AESS at time t is expressed as:

$$\Delta p_{j,t}^{AESS} = d_{j1,t}\delta_{1,t} + d_{j2,t}\delta_{2,t} + \cdots + d_{jN_\delta,t}\delta_{N_\delta,t} \quad (15)$$

The operational constraints of the AESS are as follows:

$$-\underline{p}_t^{AESS} \leq p_t^{AESS} \leq \overline{p}_t^{AESS} \quad (16)$$

$$-\underline{\delta}_t^{AESS} \leq p_t^{AESS} - p_{t-1}^{AESS} \leq \overline{\delta}_t^{AESS} \quad (17)$$

$$E_t^{AESS} = \theta_t^{AESS} E_{t-1}^{AESS} + \Delta t \eta_t p_t^{AESS} + \varepsilon_t^{AESS} w_t^{AESS} \quad (18)$$

$$\underline{E}_t^{AESS} \leq E_t^{AESS} \leq \overline{E}_t^{AESS} \quad (19)$$

The reactive power output constraints of wind and photovoltaic units are expressed as follows:

$$\underline{q}_t^{wp} \leq q_t^{wp} \leq \overline{q}_t^{wp} \quad (20)$$

$$\underline{q}_t^{pv} \leq q_t^{pv} \leq \overline{q}_t^{pv} \quad (21)$$

Equations (20) and (21) respectively represent the reactive power output constraints of wind power and photovoltaic units.

$$\overline{q}_t^{wp} \text{ and } \underline{q}_t^{wp}$$

denote the maximum and minimum allowable reactive power output of wind power at time t, respectively.

$$\overline{q}_t^{pv} \text{ and } \underline{q}_t^{pv}$$

denote the maximum and minimum allowable reactive power output of PV units at time t, respectively.

Finally, by substituting the expressions for $p_t = r_t + G_t\delta_t - B(e_t + D_t\delta_t)$ and $$p_t^{AESS} = e_t + D_t\delta_t$$

into the objective function, the initial objective expression can be reformulated as:

Initial Objective Function:

$$\min F = \sum_{t\in T} E\left[\lambda_t^b \left(A_{(1)}^{-T}(r_t + G_t\delta_t - Be_t - BD_t\delta_t)\right)^+ - \lambda_t^s \left(-A_{(1)}^{-T}(r_t + G_t\delta_t - Be_t - BD_t\delta_t)\right)^+\right] + \sum_{t\in T}\sum_{i\in N_e} E[\lambda_t^e | e_t(i) + D_t(i)\delta_t |] \quad (22)$$

Power System Constraints:

$$a_k A^{-T}(r_t + G_t\delta_t - Be_t - BD_t\delta_t) + b_k A^{-T}q_t \leq c_k \overline{S} \; \forall k \in K, t \in T \quad (23)$$

$$\underline{V} \leq R(r_t + G_t\delta_t - Be_t - BD_t\delta_t) + Xq_t + V_0 1_N \leq \overline{V} \; \forall t \in T \quad (24)$$

$$-\underline{p}_t^{AESS} \leq e_t + D_t\delta_t \leq \overline{p}_t^{AESS} \; \forall t \in T \quad (25)$$

$$-\overline{\delta}_t^{AESS} \leq e_t - e_{t-1} + D_t\delta_t - D_t\delta_{t-1} \leq \overline{\delta}_t^{AESS} \; \forall t \in T \quad (26)$$

$$E_t^{AESS} \leq (\theta^{AESS})^t E_0^{AESS} + \sum_{i=1}^t (\theta^{AESS})^{t-i} \Delta t \eta^{AESS}(e_i + D_i\delta_i) \sum_{i=1}^t (\theta^{AESS})^{t-i} \varepsilon^{AESS} w_i \leq \overline{E}_t^{AESS} \; \forall t \in T \quad (27)$$

$$q_t = -q_t^d + G_{wp}q_t^{wp} + G_{pv}q_t^{pv} \; \forall t \in T \quad (28)$$

$$\underline{q}_t^{wp} \leq q_t^{wp} \leq \overline{q}_t^{wp} \; \forall t \in T \quad (29)$$

$$\underline{q}_t^{pv} \leq q_t^{pv} \leq \overline{q}_t^{pv} \; \forall t \in T \quad (30)$$

However, due to the fact that $\delta_t \in \Delta_t$ (i.e., the forecast error belongs to an uncertainty set), the above initial expression involves an infinite number of constraints, which makes the original formulation intractable for direct optimization.

In some embodiments, to render the initial formulation tractable and solvable, the initial objective expression and the corresponding power system constraints can be equivalently transformed, thereby deriving the final energy storage control model. Specifically, based on strong duality theory, the equivalent and solvable form of the initial expression can be derived. Using a computational platform, a control strategy for AESS aimed at the full consumption of distributed renewable energy in distribution networks can be obtained. The transformation process includes the following:

To facilitate model solvability, auxiliary variables $$C_t^b \text{ and } C_{i,t}^e$$

are introduced, so that Equation (22) is transformed into the following form:

$$\min F = \sum_{t \in T} C_t^b + \sum_{t \in T} \sum_{i \in N_e} C_{i,t}^e \qquad (31)$$

The auxiliary variables $C_t^b$ and $C_{i,t}^e$ must satisfy the following constraint conditions:

$$C_t^b \geq E[\lambda_t^b A_{(1)}^{-T}(r_t + G_t \delta_t - Be_t - BD_t \delta_t)] \qquad (32)$$

$$C_t^b \geq E[\lambda_t^s A_{(1)}^{-T}(r_t + G_t \delta_t - Be_t - BD_t \delta_t)] \qquad (33)$$

$$C_{i,t}^e \geq E[\lambda_t^e(e_t(i) + D_t(i)\delta_t)] \qquad (34)$$

$$C_{i,t}^e \geq E[-\lambda_t^e(e_t(i) + D_t(i)\delta_t)] \qquad (35)$$

Typically, the mathematical expectation of the forecast error $\delta_t$ satisfies $E[\delta_t]=0$. Therefore, Equations (32)-(35) can be simplified into the following form:

$$C_t^b \geq \lambda_t^b A_{(1)}^{-T}(r_t - Be_t) \qquad (36)$$

$$C_t^b \geq \lambda_t^s A_{(1)}^{-T}(r_t - Be_t) \qquad (37)$$

$$C_{i,t}^e \geq \lambda_t^e e_t(i) \qquad (38)$$

$$C_{i,t}^e \geq \lambda_t^e e_t(i) \qquad (39)$$

(2) Equivalence of Power System Constraints

Based on the strong duality theory, Equation (23) can be equivalently transformed into the following form:

$$\begin{cases} \exists Z_1, Z_1^T h_t \leq c_k \overline{S} - a_k A^{-T}(r_t - Be_t) - b_k A^{-T} q_t \\ Z_1^T L_t = a_k A^{-T}(G_t - BD_t), Z_1 \geq 0 \end{cases} \qquad (40)$$

Equation (24) can be equivalently transformed into the following form:

$$\begin{cases} \exists Z_2, Z_2^T h_t \leq \overline{V} - R(r_t - Be_t) - Xq_t - V_0 1_N \\ Z_2^T L_t = R(G_t - BD_t), Z_2 \geq 0 \end{cases} \qquad (41)$$

$$\begin{cases} \exists Z_3, Z_3^T h_t \leq -\underline{V} + R(r_t - Be_t) + Xq_t + V_0 1_N \\ Z_3^T L_t + R(G_t - BD_t) = \theta, Z_3 \geq 0 \end{cases}$$

Equation (25) can be equivalently transformed into the following form:

$$\begin{cases} \exists Z_4, Z_4^T h_t \leq \overline{p}_t^{agg} - e_t \\ Z_4^T L_t = D_t, Z_4 \geq 0 \end{cases} \qquad (42)$$

$$\begin{cases} \exists Z_5, Z_5^T h_t \leq \overline{p}_t^{agg} + e_t \\ Z_5^T L_t + D_t = \theta, Z_5 \geq 0 \end{cases}$$

Equation (26) can be equivalently transformed into the following form:

$$\begin{cases} \exists Z_6, Z_7, Z_6^T h_t + Z_7^T h_t \leq \overline{\delta}_t^{AESS} + e_t - e_{t-1} \\ Z_6^T L_t + D_t = 0, Z_7^T L_t - D_{t-1} = 0, Z_6 \geq 0, Z_7 \geq 0 \end{cases} \qquad (43)$$

$$\begin{cases} \exists Z_8, Z_9, Z_8^T h_t + Z_9^T h_t \leq \overline{\delta}_t^{AESS} - e_t + e_{t-1} \\ Z_8^T L_t - D_t = 0, Z_9^T L_t + D_{t-1} = 0, Z_8 \geq 0, Z_9 \geq 0 \end{cases}$$

Equation (27) can be equivalently transformed into the following form:

$$\begin{cases} \exists Y_1, \ldots, Y_t, \sum_{i=1}^{t} Y_i^T h_t \leq \overline{E}_t^{AESS} + (\theta^{AESS})^t E_0^{AESS} + \sum_{i=1}^{t}(0^{AESS})^{t-i}(\Delta t\eta e_i + \varepsilon^{AESS} w_i) \\ Y_i^T L_t = \theta^{t-i} \Delta t\eta D_i, Y_i \geq 0, i = 1, 2 \ldots, t \end{cases} \qquad (44)$$

$$\begin{cases} \exists I_1, \ldots, I_t, \sum_{i=1}^{t} I_i^T h_t \leq \underline{E}_t^{AESS} - (\theta^{AESS})^t E_0^{AESS} - \sum_{i=1}^{t}(\theta^{AESS})^{t-i}(\Delta t\eta e_i - \varepsilon^{AESS} w_i) \\ I_i^T L_t + \theta^{t-i} \Delta t\eta^{AESS} D_t = 0, I_i \geq 0, i = 1 \ldots, t \end{cases}$$

In the above embodiments, the initial objective function is constructed along with the operational constraints of the power system. Then, both the objective function and its associated constraints are subjected to equivalent transformation, resulting in a tractable energy storage control model. The control parameters can then be obtained by solving the model on a computational platform.

In some embodiments, the process of determining the operational constraints of the energy storage aggregation system includes: Obtaining the technical parameters of each energy storage system via an Energy Management System (EMS) (in this embodiment, specifically using the AcrelEMS 3.0 Smart Energy Management Platform); Constructing an individual energy storage expression for each system on the computing platform based on its respective technical parameters; Aggregating the individual energy storage expressions to obtain a composite energy storage aggregation expression; Deriving the operational constraints for the aggregated energy storage system based on the aggregated expression.

Specifically, during the definition of the operational constraints, the computing platform is used to construct a generalized energy storage aggregation model, corresponding to all participating energy resources. This model is used to quantitatively evaluate the aggregated charge/discharge potential and controllable capacity of the generalized storage cluster, thereby determining its operational feasibility domain.

The generalized energy storage aggregation model is obtained by aggregating individual generalized energy storage models (also referred to as Distributed Generalized Energy Storage Systems, DGESSs). To construct an individual DGESS model, technical parameters of each system are obtained via EMS, including maximum charge/discharge power, ramp rate, and capacity boundaries. These parameters are then used to form an energy storage expression, characterizing the system's feasible operation region.

Specifically, in some embodiments, the technical parameters include: self-discharge efficiency, charge/discharge time interval, output power, charging power, discharging power, ramp rate, capacity boundary. For each energy storage system, the energy storage expression corresponding to the energy storage system is constructed based on its technical parameters, including: constructing a power constraint expression based on the maximum charging power and maximum discharging power; constructing a ramp rate constraint expression based on the output power and ramp rate; constructing a state of charge expression based on the self-discharge efficiency, charging/discharging time interval, output power, ambient temperature influence factor, and ambient temperature; constructing a state of charge constraint expression based on the capacity boundary; and determining the energy storage expression of the energy storage system according to the power constraint expression, ramp rate constraint expression, state of charge expression, and state of charge constraint expression.

The generalized energy storage system may consist of components such as electrochemical batteries, flexible electric loads, and flexible thermal loads. Its operational feasibility region—i.e., the storage expression—can be formulated using the following equations:

$$-\underline{p}_{i,t}^{DGES} \leq p_{i,t}^{DGES} \leq \overline{p}_{i,t}^{DGES} \tag{45}$$

$$-\overline{\delta}_i \leq p_{i,t}^{DGES} - p_{i,t-1}^{DGES} \leq \overline{\delta}_i \tag{46}$$

$$E_{i,t}^{DGES} = \theta_i E_{i,t-1}^{DGES} + \Delta t \eta_i p_{i,t}^{DGES} + \varepsilon_i w_{i,t} \tag{47}$$

$$\underline{E}_{i,t}^{DGES} \leq E_{i,t}^{DGES} \leq \overline{E}_{i,t}^{DGES} \tag{48}$$

Among them, equation (45) represents the power constraint expression; equation (46) represents the ramp rate constraint expression; Equation (47) represents the state of charge (SoC) expression, and Equation (48) represents the state of charge constraint expression. In these equations, $p_{i,t}^{DGES}$ and $E_{i,t}^{DGES}$ respectively denote the output power and the state of charge of the distributed generalized energy storage system (DGES) i at time t.

$p_{i,t}^{DGES} > 0$ indicates that the generalized energy storage is in a charging state, and $p_{i,t}^{DGES} < 0$ indicates that the generalized energy storage is in a discharging state;

$\overline{p}_{i,t}^{DGES}$ and $\underline{p}_{i,t}^{DGES}$ respectively denote the maximum charging power and maximum discharging power of the DGES i at time t; $\overline{\delta}_i$ denotes the maximum ramp rate of the DGES i; $\theta_i$ denotes the self-discharge efficiency of the DGES i; $\Delta_t$ denotes the time interval for charging or discharging of the generalized energy storage; $\eta_i$ denotes the power-to-energy conversion coefficient of the DGES i; $\varepsilon_i=1-\theta_i$ denotes the ambient temperature influence factor of the DGES i at time t; $w_{i,t}$ denotes the ambient temperature at the location of the DGES i;

$\overline{E}_{i,t}^{DGES}$ and $\underline{E}_{i,t}^{DGES}$ respectively denote the upper and lower bounds of the state of charge of the DGES i at time t.

For the purpose of facilitating subsequent formula derivation, equations (45) through (48) are transformed into the following compact form:

$$\Phi_i = \{p_i^{DGES} \in \square^T \mid K_i p_i^{DGES} \leq M_i\} \tag{49}$$

In the above, $$p_i^{DGES} \in \square^T = [p_{i,1}^{DGES}, p_{i,2}^{DGES}, \ldots, p_{i,T}^{DGES}]^T = [p_i^{DGES}]_{T \times 1}, [\cdot]_{T \times 1}$$

denotes a T×1 dimensional vector; $\Phi_i$ represents the feasible operating region of DGES i; $K_i$ and $M_i$ are parameter matrices, whose calculation formulas are given as follows:

$$K_i = (I_T; -I_T; D_i; -D_i; A_i^{-1} B_i; -A_i^{-1} B_i) \tag{50}$$

$$M_i = (\overline{p}_i^{DGES}; \underline{p}_i^{DGES}; \overline{\delta}_i; \overline{\delta}_i; \overline{E}_i^{DGES} - A_i^{-1} C_i; -\underline{E}_i^{DGES} + A_i^{-1} C_i) \tag{51}$$

In the above expressions, $I_T=[1]_{T \times 1}$ denotes a T×1 dimensional vector with all elements equal to 1;

$$\overline{p}_i^{DGES} = [\overline{p}_i^{DGES}]_{T \times 1} \text{ and } \underline{p}_i^{DGES} = [\underline{p}_i^{DGES}]_{T \times 1}$$

respectively represent the maximum charging power and maximum discharging power of DGES i at each time step over the T time horizon; $\overline{\delta}_i=[\overline{\delta}_i]_{T-1 \times 1}$ denotes the maximum ramp rate of DGES i at each time step over the (T−1) time horizon;

$$\overline{E}_i^{DGES} = [\overline{E}_i^{DGES}]_{T \times 1} \text{ and } \underline{E}_i^{DGES} = [\underline{E}_i^{DGES}]_{T \times 1}$$

respectively denote the maximum and minimum allowable state of charge (SoC) boundaries of DGES i at each time step over the T time horizon; $A_i$, $B_i$, $C_i$ and $D_i$ are all parameter matrices, whose calculation formulas are as follows:

$$A_i = \begin{bmatrix} 1 & 0 & 0 & \cdots & 0 \\ -\theta_i & 1 & 0 & \cdots & 0 \\ 0 & -\theta_i & 1 & \cdots & 0 \\ \vdots & \vdots & \vdots & \ddots & \vdots \\ 0 & 0 & 0 & \cdots & 1 \end{bmatrix}_{T \times T} \quad (52)$$

$$B_i = \Delta t \eta_i I_T \quad (53)$$

$$C_i = \left[ \theta_i E_{i,0}^{DGES} + \varepsilon_i w_{i,1}, \varepsilon_i w_{i,2}, \ldots, \varepsilon_i w_{i,T} \right]^T \quad (54)$$

$$D_i = \begin{bmatrix} -1 & 1 & 0 & 0 & \cdots & 0 \\ 0 & -1 & 1 & 0 & \cdots & 0 \\ 0 & 0 & -1 & 1 & \cdots & 0 \\ \vdots & \vdots & \vdots & \vdots & \ddots & \vdots \\ 0 & 0 & 0 & 0 & \cdots & 1 \end{bmatrix}_{T-1 \times T} \quad (55)$$

In the above expression, $$E_{i,0}^{DGES}$$

denotes the initial SOC of DGES i.

In consideration of the characteristics of generalized energy storage resources—namely, small power capacity, small energy capacity, and large quantity—each GES system located at a distribution network node is effectively aggregated into an equivalent energy storage system of uniform form, i.e., an AESS, to reduce the complexity of control and decision-making. The essence of aggregating generalized energy storage resources lies in computing the Minkowski sum of the feasible power domains (polytopes) of all flexibility resources. Therefore, the operational feasible domain of the AESS is expressed by the following formulation:

$$\Phi_j^{AESS} = \bigcup_{i \in \Omega_j} \Phi_i = \left\{ p_j^{AESS} \in \square^T \mid p_j^{AESS} = \sum_{i \in \Omega_j} p_i^{DGES}, p_i^{PGES} \in \Phi_i \right\} \quad (56)$$

In the above expression, $\Phi_j^{AESS}$ denotes the operational feasible domain of the output power of AESS j; U represents the Minkowski sum; $\Omega_j$ denotes the set of all generalized energy storage systems under AESS j;

$$p_j^{AESS} = \left[ p_j^{AESS} \right]_{T \times 1}$$

denotes the output power of AESS j at each time step over a scheduling horizon of length T.

However, as the number of GES units increases, the computational complexity of obtaining the Minkowski sum of multiple polytopes grows exponentially, rendering the above approach impractical in real-time applications. Therefore, to reduce computational complexity, in some embodiments, the aggregation of individual energy storage expressions is performed to obtain an aggregated energy storage expression. This includes: determining a base polytope; the base polytope is defined based on the technical parameters corresponding to each energy storage expression; for each energy storage expression, determining a scaling factor and a translation factor; determining an approximate fitted expression of the corresponding energy storage expression based on the base polytope and the associated scaling and translation factors; and obtaining the aggregated energy storage expression based on all the approximate fitted expressions.

The present application adopts an inner-approximation method for feasible domains, whereby the Minkowski sum in the aggregation process is simplified into algebraic operations. The specific computation procedure is as follows:

The inner-approximation method aims to approximate the feasible domain $\Phi_i(K_i, M_i)$ of each DGES by scaling and translating a base polytope. The formulation is given as:

$$\tilde{\Phi}_j = \xi_j \Phi_0 + \chi_j = \left\{ p_i^{GES} \in \square^T \mid K_0 \left( p_i^{GES} - \chi_j \right) \leq \xi_i M_0 \right\} \quad (57)$$

In the above expression, $\tilde{\Phi}_i$ denotes the approximated feasible domain of $\Phi_i$; $\xi_i$ denotes the scaling factor of the base polytope; $\chi_i$ denotes the translation factor of the base polytope, where $\chi_i \in \square^T$. $K_0$ and $M_0$ represent parameter matrices derived by calculating the average values of technical parameters across all DGES units, and share the same structure as $K_i$ and $M_i$.

Therefore, equation (57) can be approximated by equation (58) for computational simplification.

$$\tilde{\Phi}_j^{AESS} = \bigcup_{i \in \Omega} \tilde{\Phi}_i = \sum_{i \in \Omega_j} \xi_i \Phi_0 + \sum_{i \in \Omega_j} \chi_i \quad (58)$$

The parameters $\xi_i$ and $\chi_i$ are obtained by solving the following linear programming problem.

$$\underset{\xi_i > 0, \chi_i, G \geq 0}{\text{maximize}} \; \xi_i \quad (59)$$

$$\text{s.t.} \quad GK_0 = K_i$$

$$\xi_i GM_0 + K_i \chi_i \leq M_i$$

In the above formulation, G denotes the decision variable matrix.

Based on the obtained parameters, the aggregated operational feasible domain of the generalized energy storage systems can be represented by equations (60) through (63), thereby quantifying the charge/discharge potential and controllable capacity of the generalized energy storage cluster. This serves to provide data support for the participation of the generalized energy storage aggregator in the optimal scheduling of the distribution network.

$$-\underline{p}_{j,t}^{AESS} \leq p_{j,t}^{AESS} \leq \overline{p}_{j,t}^{AESS} \quad (60)$$

$$-\overline{\delta}_j^{AESS} \leq p_{j,t}^R - p_{j,t-1}^{AESS} \leq \overline{\delta}_j^{AESS} \quad (61)$$

$$E_{j,t}^{AESS} = \theta_{j,t-1}^{AESS} E_{j,t-1}^{AESS} + \Delta t \eta_j^{AESS} p_{j,t}^{AESS} + \varepsilon_j^{AESS} w_{j,t}^{AESS} \quad (62)$$

$$\underline{E}_{j,t}^{AESS} \leq E_{j,t}^{AESS} \leq \overline{E}_{j,t}^{AESS} \quad (63)$$

In the above expression, $$p_{j,t}^{AESS} \text{ and } E_{j,t}^{AESS}$$

respectively denote the output power and the state of charge (SoC) of the AESS j at time t;

$\overline{p}_{j,t}^{AESS}$ and $\underline{p}_{j,t}^{AESS}$ respectively denote the maximum charging power and discharging power of AESS j at time t;

$\overline{\delta}_j^{AESS}$ denotes the maximum ramp rate of AESS j;

$\theta_j^{AESS}$ denotes the self-discharge efficiency of AESS j;

$\eta_j^{AESS}$ denotes the power-to-energy conversion coefficient of AESS j;

$\varepsilon_j^{AESS}$ denotes the ambient temperature influence factor of AESS j;

$w_{j,t}^{AESS}$ denotes the ambient temperature at the location of AESS j at time t;

$\overline{E}_{j,t}^{AESS}$ and $\underline{E}_{j,t}^{AESS}$ respectively denote the maximum and minimum energy state boundaries of AESS j.

The aggregated operational feasible domain of the generalized energy storage systems enables quantitative evaluation of the charging/discharging potential and controllable capacity of the generalized energy storage cluster, thereby providing data support for the participation of the generalized energy storage aggregator in optimal scheduling of the distribution network. In some embodiments, the aggregated energy storage expression includes at least an aggregated power constraint expression, an aggregated ramp rate constraint expression, and an aggregated capacity state constraint expression. Based on the aggregated energy storage expression, the operational constraints of the aggregated energy storage system are determined. This includes: obtaining the aggregated scaling factor and aggregated translation factor; based on the aggregated scaling factor, aggregated translation factor, average charging power of the aggregated energy storage system, and average discharging power of the aggregated energy storage system, determining the aggregated technical parameters for the aggregated power constraint expression; based on the aggregated scaling factor, aggregated translation factor, and average ramp rate of the aggregated energy storage system, determining the aggregated technical parameters for the aggregated ramp rate constraint expression; based on the aggregated scaling factor, aggregated translation factor, and average capacity state boundaries of the aggregated energy storage system, determining the aggregated technical parameters for the aggregated capacity state constraint expression; According to the aggregated energy storage expression with the determined aggregated technical parameters, the operational constraints of the aggregated energy storage system are determined.

The technical parameters in the above aggregated energy storage expression are calculated as follows:

$$\begin{cases} \underline{p}_j^{AESS} = \xi \underline{p}_0^{DGES} - \chi \\ \overline{p}_j^{AESS} = \xi \overline{p}_0^{DGES} + \chi \\ \overline{\delta}_j^{AESS} = \xi \overline{\delta}_0^{DGES} + D_0 \chi \\ \overline{E}_j^{AESS} = \xi \overline{E}_0^{DGES} - A_0^{-1} B_0 \chi \\ \underline{E} = \xi \overline{E}_0^{DGES} + A_0^{-1} B_0 \chi \end{cases} \quad (64)$$

In the equation, $\overline{p}_j^{AESS} = [\overline{p}_j^{AESS}]_{T \times 1}$ and $\underline{p}_j^{AESS} = [\underline{p}_j^{AESS}]_{T \times 1}$ respectively denote the maximum charging power and discharging power of AESS j; $\overline{p}_0^{DGES} = [\overline{p}_0^{DGES}]_{T \times 1}$ and $\underline{p}_0^{DGES} = [\underline{p}_0^{DGES}]_{T \times 1}$ respectively denote the average maximum charging power and average maximum discharging power of all DGESs at each time step t over the time horizon T;

$\overline{\delta}_j^{AESS} = [\overline{\delta}_j^{AESS}]_{T \times 1}$ denotes the maximum ramp rate of AESS j at each time step t;

$\overline{\delta}_0^{DGES} = [\overline{\delta}_0^{DGES}]_{T \times 1}$ denotes t the average maximum ramp rate of all DESS at each time step t;

$\overline{E}_j^{AESS} = [\overline{E}_j^{AESS}]_{T \times 1}$ and $\underline{E}_j^{AESS} = [\underline{E}_j^{AESS}]_{T \times 1}$ respectively denote the upper and lower boundaries of the energy state of AESS j over the time horizon T;

$$\bar{E}_0^{DGES} = \left[\bar{E}_0^{DGES}\right]_{T\times 1} \text{ and } \underline{E}_0^{DGES} = \left[\underline{E}_0^{DGES}\right]_{T\times 1}$$

denote the average energy state boundaries of all DGESs at each time step $$t; \xi_j^*$$

denotes the optimal scaling factor of the base polytope, satisfying $$\xi = \sum_{j\in\Omega_j} \xi_j^*; \chi_i^*$$

denotes the optimal translation factor of the base polytope, satisfying $$\chi = \sum_{i\in\Omega_j} \chi_i^*.$$

Step 104: Based on the power constraint conditions and the objective scheduling expression, the control parameters of the AESS are obtained.

Specifically, a computational platform is used to solve the power constraint conditions and the objective scheduling expression to determine the control strategy of the AESS, aiming at the full accommodation of distributed renewable energy in the distribution network, thereby obtaining the control parameters of the aggregated energy storage system. The control parameters of the aggregated energy storage system may include a day-ahead output baseline $e_t$ and a real-time power adjustment distribution coefficient $D_t$. The day-ahead output baseline may be a curve representing the fitting relationship between the day-ahead output of the aggregated energy storage system and time.

Step 106: Based on the control parameters of the aggregated energy storage system, the aggregated output curve of the AESS is determined. The aggregated output curve is a curve used to characterize the fitting relationship between the output of the aggregated energy storage system and time.

The aggregated output curve refers to the day-ahead real-time output curve, which can be used to characterize the fitting relationship between the real-time output of the AESS and time on the day-ahead basis. Specifically, once the control parameters are obtained, the real-time output of the AESS can be calculated, thereby obtaining the aggregated output curve of the AESS. The calculation is performed according to the following equation:

$$p_t^{AESS} = e_t + D_t \delta_t,$$

where $\delta_t$ denotes the active power forecast error of the photovoltaic or wind power generation.

Step 108: A computational platform is used to decompose the aggregated output curve, so as to determine the respective decomposed output curves of each energy storage system within the aggregated energy storage system. Each energy storage system outputs according to its respective decomposed output curve.

In some embodiments, decomposing the aggregated output curve to determine the respective decomposed output curves of each energy storage system within the aggregated energy storage system includes:

Obtaining the scaling factor and translation factor of each energy storage system, respectively;

Based on the respective scaling factor and translation factor of each energy storage system, decomposing the aggregated output curve to determine the respective decomposed output curves of each energy storage system within the aggregated energy storage system.

Based on the obtained day-ahead output curve of the generalized energy storage aggregator, i.e., the aggregated output curve, the aggregated output curve is decomposed to each distributed generalized energy storage unit to determine the day-ahead and real-time output curves of the distributed generalized energy storage units. Specifically, the method includes:

Based on the scaling factor and translation factor, each generalized energy storage aggregator decomposes the day-ahead and real-time dispatch instructions to each distributed generalized energy storage unit. The calculation is performed according to the following equation:

$$p_{i,t}^{DGES} = \frac{\xi_i}{\sum_{i\in\Omega_j}\xi_i}\left(p_{j,t}^{AESS} - \sum_{i\in\Omega_j}\chi_i\right) + \chi_i \tag{65}$$

where $$p_{i,t}^{MES}$$

denotes the active power output of distributed generalized energy i at time t;

$$p_{j,t}^{AESS}$$

denotes the active power output of generalized energy storage aggregator j at time t; $\xi_i$ denotes the scaling factor corresponding to distributed generalized energy storage i; $\chi_i$ denotes the translation factor corresponding to distributed generalized energy storage i.

Figure 2:
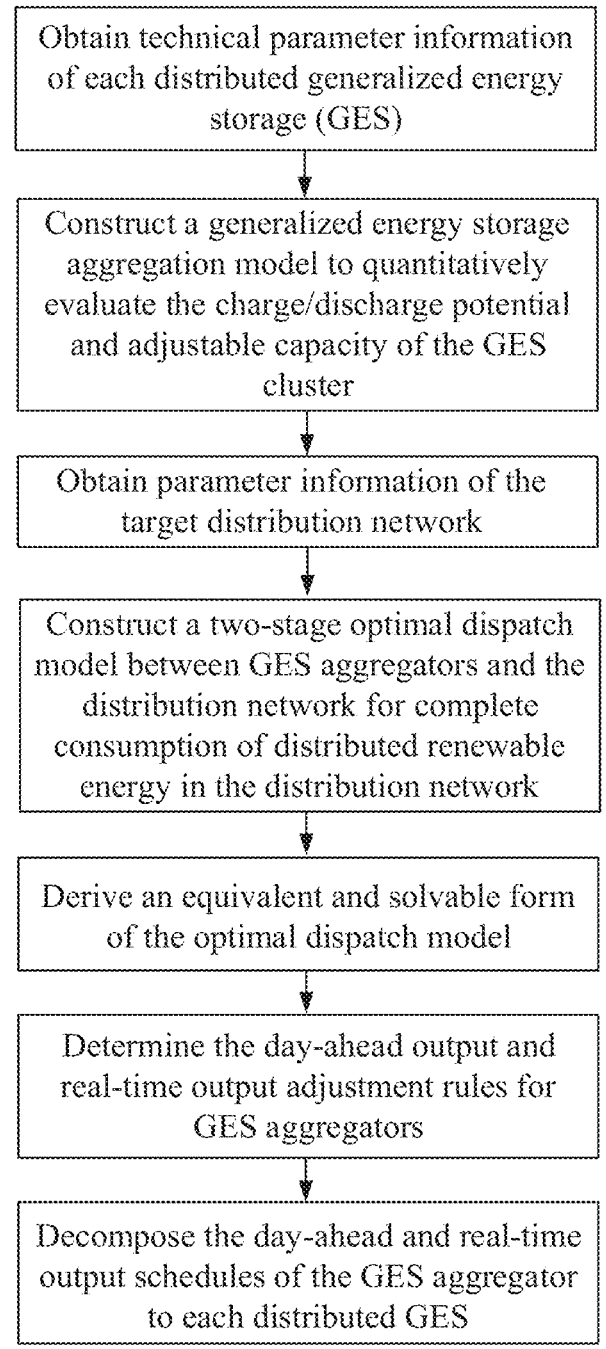
FIG. 2 is a schematic flowchart of a generalized energy storage control method for full consumption of distributed renewable energy in a distribution network according to another embodiment.

In some embodiments, referring to FIG. 2, a schematic flow diagram of a generalized energy storage control method for full consumption of new energy in distribution networks is provided by the present application, and the method specifically includes the following steps:

Step 1: Technical parameter information of each distributed generalized energy storage system (DGESS) is obtained through the Energy Management System (EMS), which may specifically adopt the Acrel EMS 3.0 Smart Energy Management Platform in the present embodiment. The parameter information includes, but is not limited to, the maximum charging and discharging power, ramp rate, and capacity boundaries of the generalized energy storage systems.

Step 2: Based on the technical parameter information of distributed generalized energy storage systems collected in Step 1, a generalized energy storage aggregation model is constructed using a computing platform to quantitatively evaluate the charge/discharge potential and adjustable capacity of the generalized energy storage cluster.

Step 3: Parameter information of the target distribution network, load, and renewable energy sources is acquired. This includes the topology of the target distribution network, line parameter data, load demand, and forecasted output of renewable energy sources. Specifically, the topology and line parameters of the target distribution network are obtained through the Distribution Geographic Information System (GIS) and the Distribution Automation System (DAS), while switch status and topological changes are monitored in real time via the Supervisory Control and Data Acquisition (SCADA) system. In addition, the Energy Management System (EMS) provides information on forecasted load power, short-term forecasted output, and real-time output of renewable energy sources.

Step 4: Based on the parameter information obtained in Steps 2 and 3, a two-stage optimization scheduling model is constructed on the computing platform for the generalized energy storage aggregator and the distribution network, aiming at the full consumption of distributed renewable energy in the distribution network.

Step 5: Utilizing strong duality, an equivalent solvable form of the two-stage optimization scheduling model established in Step 4 is derived. A computing platform is then used to determine the regulation strategy of the Aggregated Energy Storage System (AESS) for the full consumption of distributed renewable energy in the distribution network.

Step 6: Based on the day-ahead output curve and real-time adjustment rules of the generalized energy storage aggregator obtained from the model solution in Step 5, the day-ahead and real-time output curves are decomposed to individual distributed generalized energy storage systems using a computing platform, thereby determining the respective day-ahead and real-time output curves of each distributed generalized energy storage system.

Although the flowcharts of the foregoing embodiments illustrate a sequence of steps executed in accordance with the directional arrows, it should be understood that the order of execution of such steps is not necessarily limited to the order shown unless explicitly stated otherwise herein. The steps may be executed in a different order, or some steps may be performed in parallel or in a staggered manner with at least a portion of other steps or substeps, depending on implementation requirements or design preferences. Additionally, at least some of the steps illustrated in the flowcharts of the foregoing embodiments may comprise multiple substeps or multiple stages of execution. These substeps or stages are not required to be completed at the same time or in a strictly sequential manner. Rather, they may be executed at different times or in a different sequence, including alternately or iteratively with other steps or substeps.

In one embodiment, the present disclosure further provides a generalized energy storage regulation system for facilitating full consumption of renewable energy in distribution networks. The system comprises:

An acquisition module, configured to obtain a pre-constructed energy storage regulation model. The energy storage regulation model comprises an objective scheduling expression and corresponding power constraint conditions. The objective scheduling expression is a model for determining the output parameters of an AESS;

A processing module, configured to determine regulation parameters of the AESS based on the power constraint conditions and the objective scheduling expression;

A curve determination module, configured to determine an aggregated output curve of the AESS according to the regulation parameters. The aggregated output curve represents a fitted relationship between the output and time of the AESS;

A decomposition module, configured to decompose the aggregated output curve and determine a decomposed output curve for each individual energy storage system within the AESS. Each energy storage system is controlled to output power according to its corresponding decomposed output curve.

In some embodiments, the acquisition module is further configured to determine an initial scheduling expression based on the expected electricity purchase and sale cost of the distribution network and the expected power regulation cost of the energy storage aggregation system; wherein the expected electricity purchase and sale cost is determined by the electricity purchase price from the main grid, the electricity sale price, and the electricity purchase quantity; the expected power regulation cost is determined by the regulation cost coefficient and the output power of the energy storage aggregation system; the power constraint conditions corresponding to the initial expression are determined according to the safe operation constraints of the distribution network, the operation constraints of the energy storage aggregation system, and the reactive power output constraints of wind and solar power; based on the initial scheduling expression and the power constraint conditions corresponding to the initial expression, an equivalent transformation is performed to determine the energy storage regulation model.

In some embodiments, the acquisition module is further configured to obtain the technical parameters of each energy storage system; for each energy storage system, construct the corresponding energy storage expression based on its technical parameters; aggregate the respective energy storage expressions to obtain the aggregated energy storage expression; determine the operational constraints of the energy storage aggregation system based on the aggregated energy storage expression.

In some embodiments, the acquisition module is further configured to construct a power constraint expression based on the maximum charging power and maximum discharging power; construct a ramp rate constraint expression based on the output power and ramp rate; construct a state-of-charge expression based on the self-discharge efficiency, charging/discharging time intervals, output power, ambient temperature impact factor, and ambient temperature; construct a state-of-charge constraint expression based on the capacity boundaries; determine the energy storage expression of the energy storage system based on the power constraint expression, ramp rate constraint expression, state-of-charge expression, and state-of-charge constraint expression.

In some embodiments, the acquisition module is further configured to determine a basic polytope, which is determined based on the technical parameters corresponding to each energy storage expression; for each energy storage expression, determine the scaling factor and translation factor of the corresponding energy storage expression; determine an approximate fitting expression of the corresponding energy storage expression based on the basic polytope and the scaling factor and translation factor of the corresponding energy storage expression; obtain the aggregated energy storage expression based on the respective approximate fitting expressions.

In some embodiments, the acquisition module is further configured to obtain the aggregated scaling factor and aggregated translation factor; determine the aggregated technical parameters of the aggregated power constraint expression based on the aggregated scaling factor, aggregated translation factor, average charging power of the energy storage aggregation system, and average discharging power of the energy storage aggregation system; determine the aggregated technical parameters of the aggregated ramp rate constraint expression based on the aggregated scaling factor, aggregated translation factor, and average ramp rate of the energy storage aggregation system; determine the aggregated technical parameters of the aggregated state-of-charge constraint expression based on the aggregated scaling factor, aggregated translation factor, and average state-of-charge boundary of the energy storage aggregation system; determine the operational constraints of the energy storage aggregation system according to the aggregated energy storage expression with the determined aggregated technical parameters.

In some embodiments, the decomposition module is further configured to obtain the individual scaling factor and translation factor for each energy storage system; decompose the aggregated output curve based on the individual scaling factor and translation factor of each energy storage system to determine the respective decomposed output curve for each energy storage system within the energy storage aggregation system.

The modules of the above-described generalized energy storage regulation system for complete consumption of distributed renewable energy in the distribution network can be implemented entirely or partially through software, hardware, or a combination thereof. The above modules may be embedded in hardware form within or independently of the processor in a computer device, or may be stored in the memory of a computer device in the form of software, so as to enable the processor to execute the operations corresponding to each module.

Figure 3:
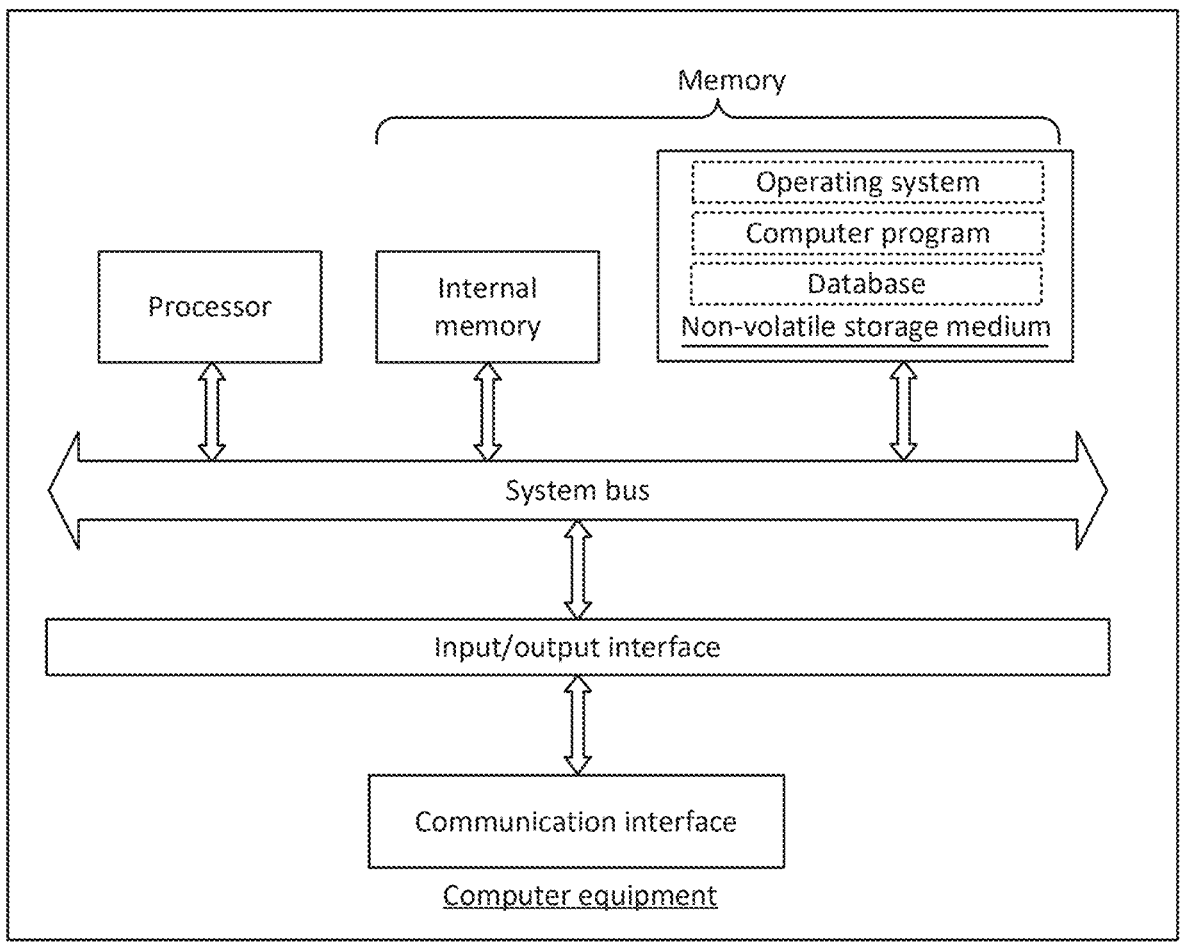
FIG. 3 is a structural diagram of a computing device according to one embodiment.

In one embodiment, a computer device is provided, on which the generalized energy storage regulation system oriented toward complete consumption of renewable energy in the distribution network can be deployed. The computer device may be a server, and its internal structural diagram may be as shown in FIG. 3. The computer device comprises a processor, a memory, an input/output interface (I/O), and a communication interface. The processor, memory, and input/output interface are connected via a system bus, and the communication interface is connected to the system bus via the input/output interface. The processor of the computer device is used to provide computing and control capabilities. The memory of the computer device includes a non-volatile storage medium and internal memory. The non-volatile storage medium stores the operating system, computer programs, and databases. The internal memory provides the runtime environment for the operating system and computer programs stored in the non-volatile storage medium. The database of the computer device is used to store relevant data of the power system. The input/output interface of the computer device is used to exchange information between the processor and external devices. The communication interface of the computer device is used to communicate with external terminals via a network. The computer program is executed by the processor to implement a generalized energy storage regulation method oriented toward complete consumption of renewable energy in the distribution network.

It will be understood by those skilled in the art that the structure shown in FIG. 3 is merely a block diagram of partial structures related to the present application scheme, and does not constitute a limitation on the computer device to which the present application scheme is applied. The specific computer device may include more or fewer components than those shown in the figure, or may combine certain components, or may have different component arrangements.

In one embodiment, a computer device is provided, comprising a memory and a processor, wherein the memory stores a computer program, and the processor executes the computer program to implement the steps of the above-described generalized energy storage regulation method oriented toward complete consumption of renewable energy in the distribution network.

In one embodiment, a computer-readable storage medium is provided, on which a computer program is stored. When executed by a processor, the computer program implements the steps of the generalized energy storage regulation method oriented toward complete consumption of renewable energy in the distribution network. In one embodiment, a computer program product is provided, comprising a computer program, which, when executed by a processor, implements the steps of the generalized energy storage regulation method oriented toward complete consumption of renewable energy in the distribution network. It should be noted that the user information (including but not limited to user device information, personal information, etc.) and data (including but not limited to data used for analysis, storage, display, etc.) involved in this application are all authorized by the user or fully authorized by relevant parties, and the collection, use, and processing of relevant data shall comply with the relevant laws, regulations, and standards of applicable countries and regions.

It will be understood by those of ordinary skill in the art that all or part of the processes in the foregoing method embodiments can be implemented by a computer program instructing relevant hardware, and the computer program may be stored in a non-volatile computer-readable storage medium. When executed, the computer program may include the procedures of the foregoing method embodiments. In the embodiments provided by the present application, any reference to memory, database, or other media may include at least one of non-volatile and volatile memory. The non-volatile memory may include Read-Only Memory (ROM), magnetic tapes, floppy disks, flash memory, optical storage, high-density embedded non-volatile memory, Resistive RAM (ReRAM), Magnetoresistive RAM (MRAM), Ferroelectric RAM (FRAM), Phase Change Memory (PCM), graphene memory, etc. Volatile memory may include Random Access Memory (RAM) or external cache memory, among others. By way of example and not limitation, RAM may take various forms, such as Static RAM (SRAM) or Dynamic RAM (DRAM), etc. The databases involved in the embodiments provided in this application may include at least one of relational and non-relational databases. The non-relational databases may include distributed databases based on blockchain, among others, without limitation. The processors involved in the embodiments provided in this application may be general-purpose processors, central processing units, graphics processing units, digital signal processors, programmable logic devices, or data processing logic based on quantum computing, among others, without limitation.

Figure 4:
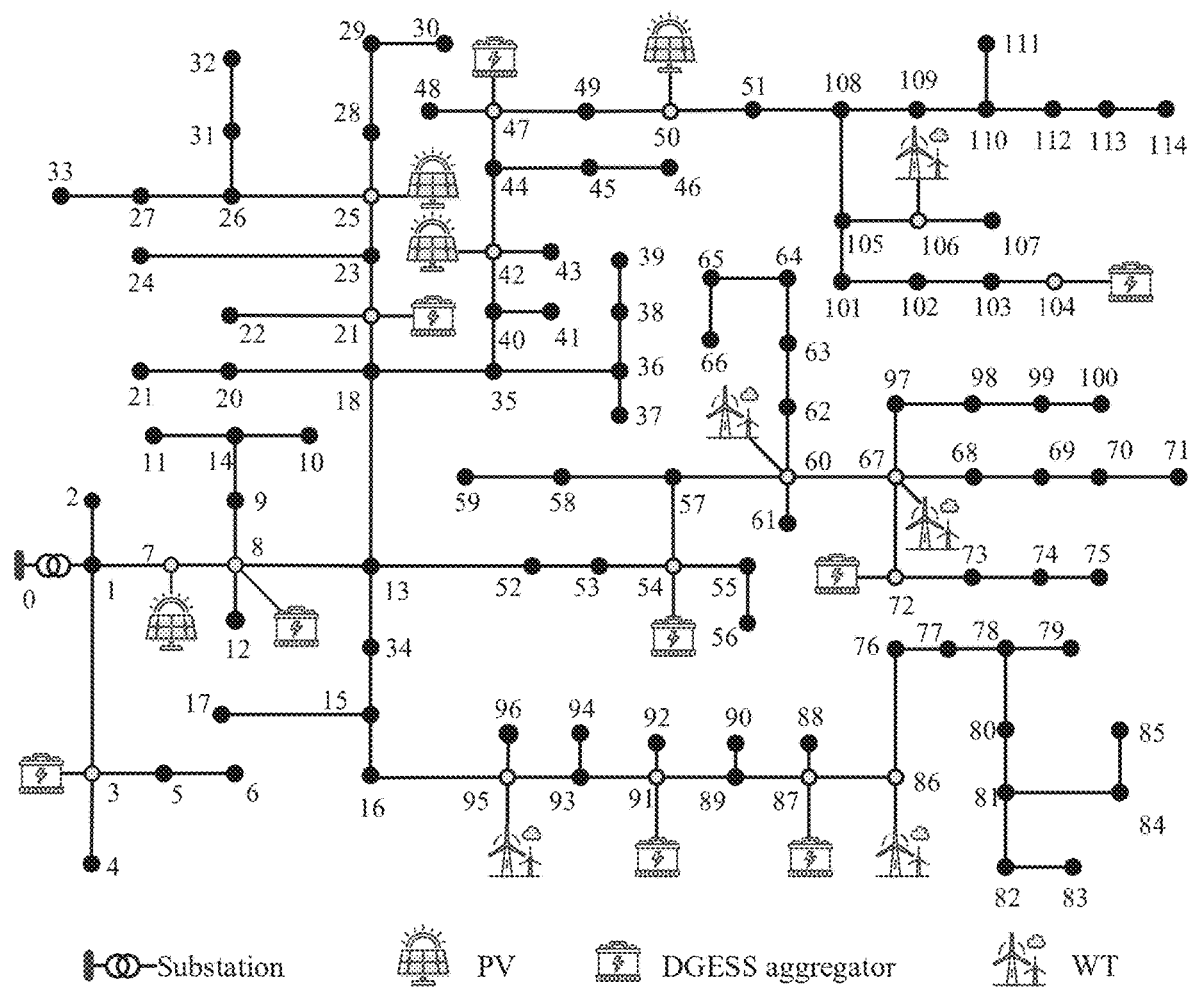
FIG. 4 is a topological diagram of the IEEE 123-node distribution system used in simulation testing according to one embodiment.
Figure 5:
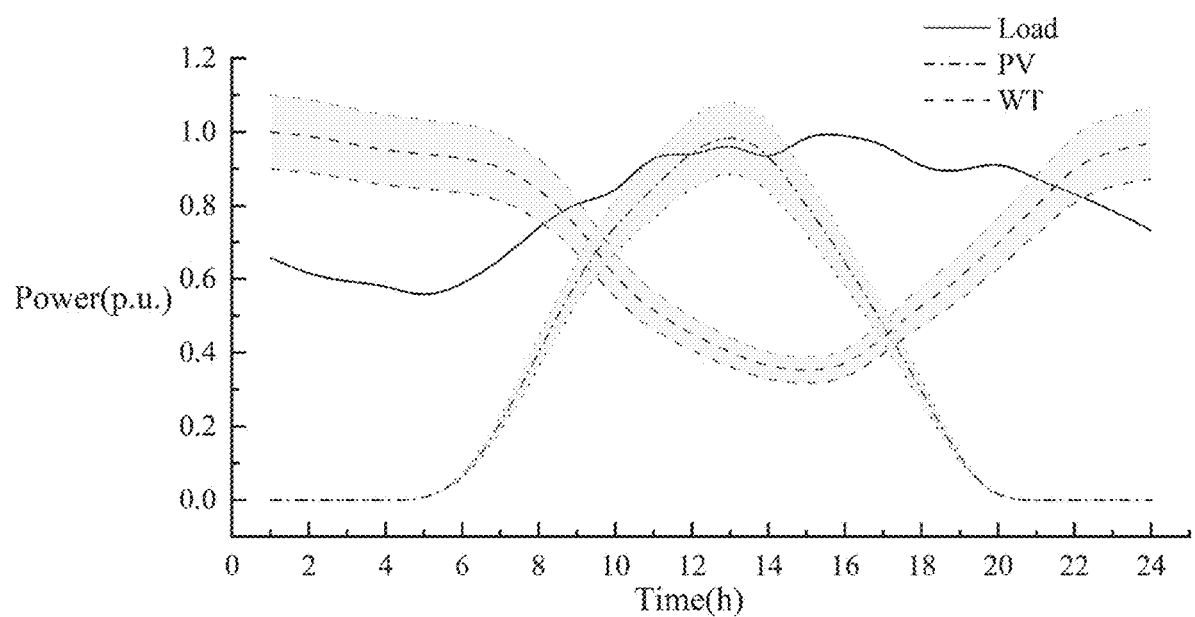
FIG. 5 is a diagram showing the normalized predicted output curves of wind power, photovoltaic power, and load variation in simulation testing according to one embodiment.

To verify the effectiveness and superiority of the proposed method, simulation tests are conducted based on a modified IEEE 123-node distribution system. In this distribution system, there are five wind turbines (WTs), four photovoltaic (PV) units, and nine DGESS aggregators, as illustrated in FIG. 4. The maximum and minimum per-unit (p.u.) node voltage magnitudes are 1.05 p.u. and 0.95 p.u., respectively. Node 0 is designated as the substation node, with a fixed voltage magnitude of 1 p.u. Based on statistical data from the Energy Management System (EMS), the normalized curves of predicted wind power output, PV output, and load variation are depicted in FIG. 5. The rated capacities of the PV and WT units are 300 kW and 400 kW, respectively. For simplicity, it is assumed that the load forecast data obtained from the EMS are perfectly accurate. Moreover, according to publicly available data from the electricity trading platform, the electricity purchase prices from the main grid during peak load periods (11:00-19:00), valley periods (01:00-07:00), and other periods are set at $0.08/kWh, $0.03/kWh, and $0.05/kWh, respectively. The electricity selling price from the distribution network to the main grid is set as 90% of the corresponding purchase price. Referring to project quotations from energy storage equipment vendors, the AESS regulation cost coefficient is set to $0.015/kWh. The computational platform used is a personal computer running MATLAB 2020a, with a CPU model of Intel Core i5 (2.5 GHz) and 8 GB of RAM. The energy storage regulation model is built using the YALMIP toolbox, and the CPLEX solver is employed for optimization.

Figure 6A:
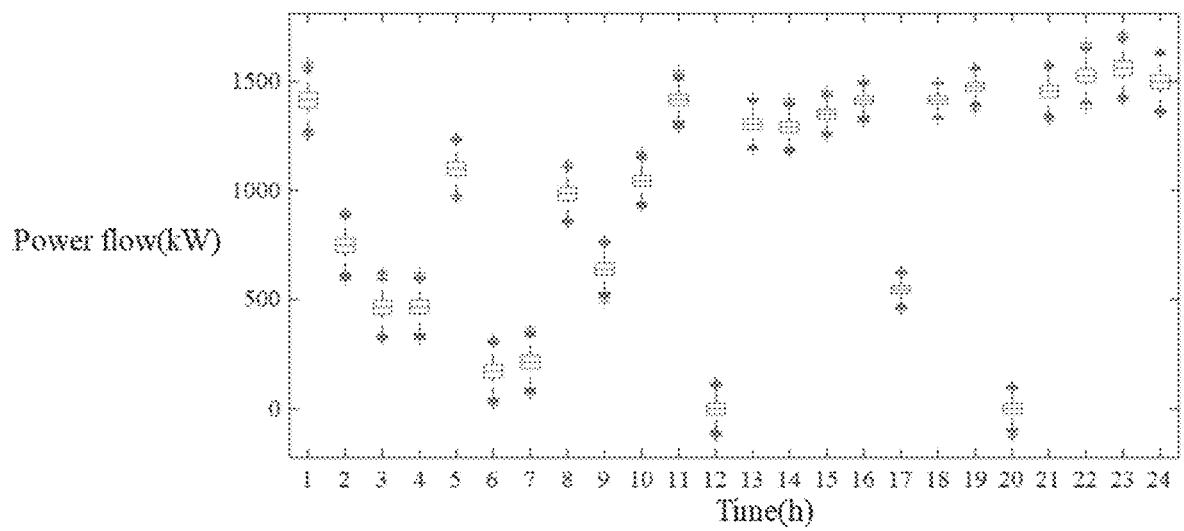
FIGS. 6A-6B show the daily power exchange curves between the main grid and the distribution network in simulation testing according to one embodiment, where.
Figure 6B:
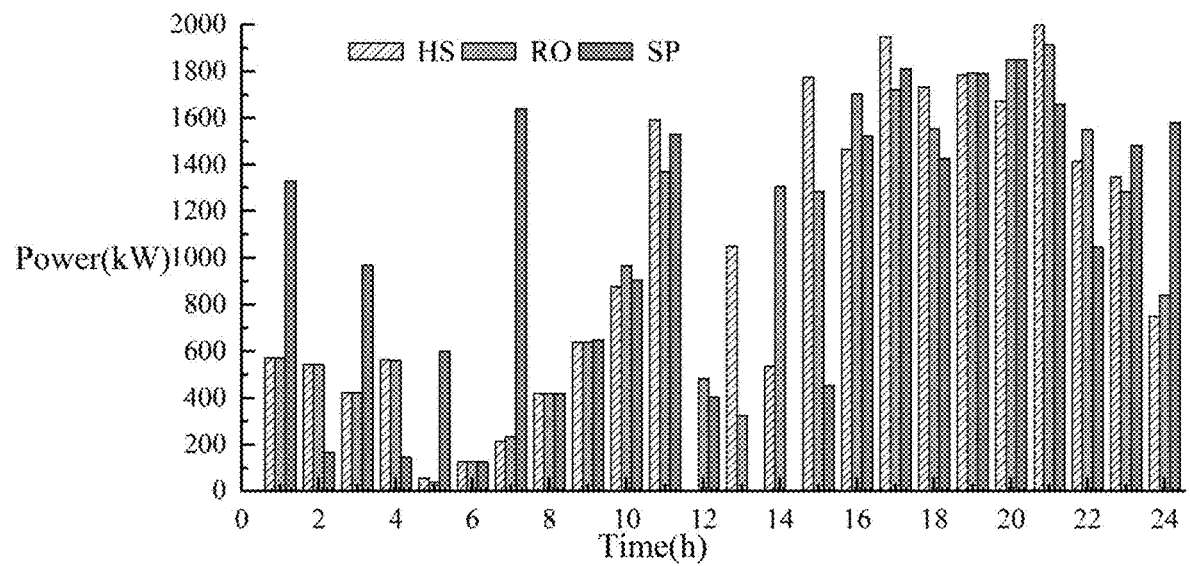

To validate the effectiveness and superiority of the proposed method (denoted as HS), it is compared against three benchmark methods: a method without consideration of uncertainty (WU), a robust optimization method with centralized energy storage control (RO), and a stochastic programming method (SP). To evaluate the performance of these four methods, 1000 scenarios of prediction errors are generated based on historical forecast error data collected by the EMS. Based on the simulation results obtained from the computational platform, FIGS. 6A-6B present the daily active power exchange curves between the main grid and the distribution network under the four methods. In the figure, a positive value indicates active power flow from the main grid to the distribution network, while a negative value indicates the reverse. As shown in FIG. 6A, due to the uncertainty in renewable energy output, the WU method results in large fluctuations in hourly power exchange between the main grid and the distribution network. In contrast, as shown in FIG. 6B, the proposed method, along with the RO and SP methods, maintains constant hourly power exchange with the main grid. This is because the uncertainties caused by the fluctuations in renewable output within the distribution network are completely absorbed by the DGESSs, preventing their propagation to the upstream main grid. This effectively mitigates the impact of renewable energy fluctuations on the main grid.

Figure 7A:
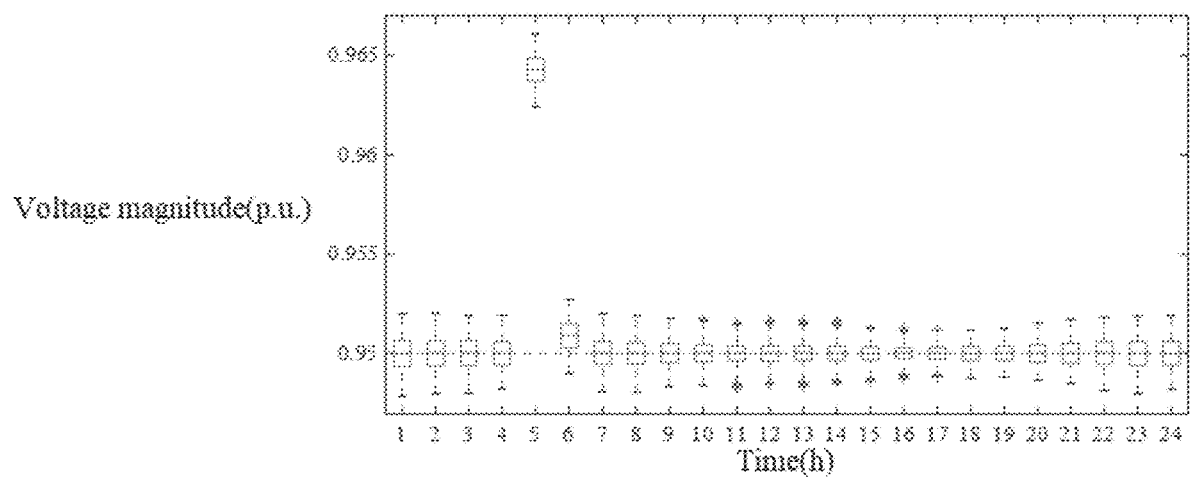
FIGS. 7A-7D show voltage magnitude variation at distribution network node 114 in simulation testing according to one embodiment, where.
Figure 7B:
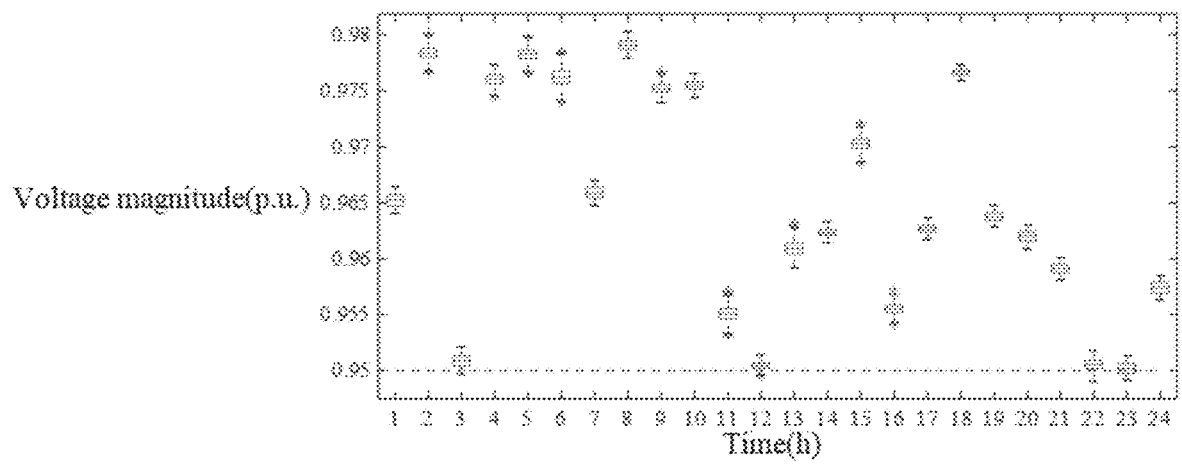
Figure 7C:
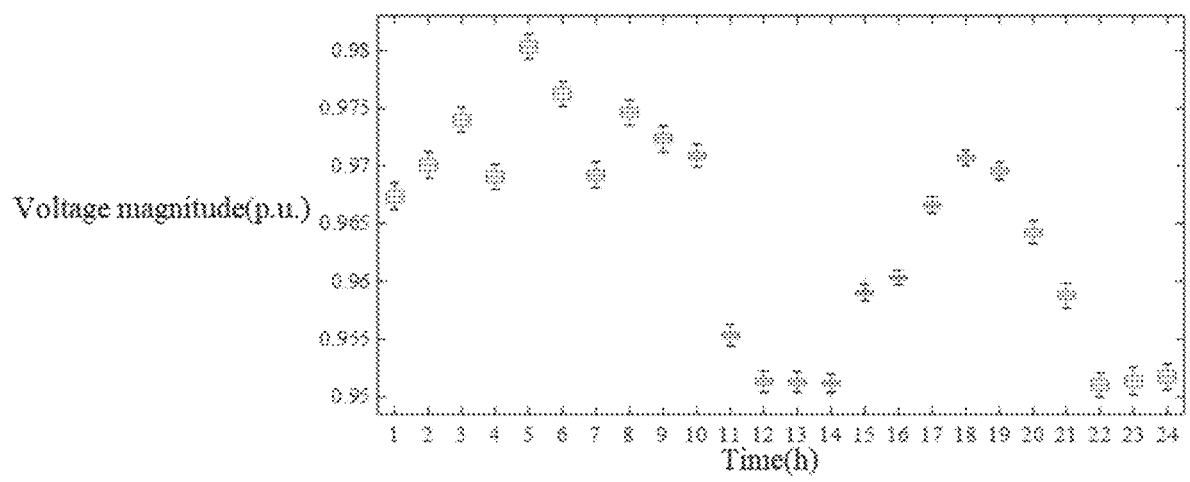
Figure 7D:
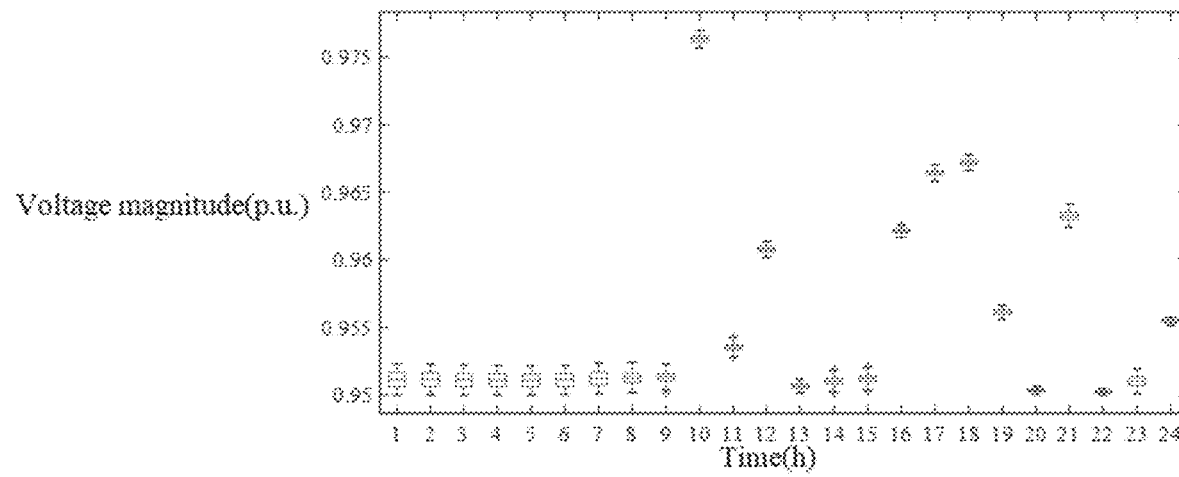

To further demonstrate the superiority of the proposed method, voltage magnitude analysis is performed on a representative node, Node 114. FIGS. 7A-7D illustrate the voltage magnitude variations at Node 114 under different methods. From FIG. 7A and FIG. 7B, it can be observed that low voltage conditions occur at certain times when using the WU and SP methods, indicating that these methods cannot guarantee voltage safety across all renewable generation scenarios. However, as shown in FIG. 7C and FIG. 7D, both the proposed method and the RO method are able to maintain node voltages within the safe range, effectively validating the robustness of the proposed method.

Table 1 presents the total operating cost of the distribution network and its components under the four methods. The distribution network must either absorb the uncertainty caused by renewable output fluctuations using internal resources or procure reserve services from the main grid to address such uncertainties. Consequently, when using the WU method, reserve costs are inevitable. Since the real-time regulation cost of AESSs is closely related to the forecasting errors of renewable output, the proposed method considers the Value at Risk (VaR) of the real-time regulation cost at a 95% confidence level. As shown in Table 1, although the power purchase cost under the proposed method is higher than that of the WU method, both the AESS regulation cost and the reserve cost are significantly lower, resulting in a relatively lower total operating cost. Due to its conservativeness, the RO method leads to the highest total operating cost. Although the SP method results in the lowest total operating cost, it fails to ensure system voltage safety. Therefore, when considering all three aspects—mitigating the impact of renewable energy fluctuations on the main grid, maintaining voltage safety and stability at distribution nodes, and achieving economic operation—the proposed method outperforms the other three benchmark methods.

TABLE 1

The overall operating cost of the DN under different methods

| Method | Energy purchasing cost ($) | Reserve cost ($) | AESSs day-ahead regulation cost ($) | AESSs real-time regulation VaR(95%)($) | Total cost ($) |
|---|---|---|---|---|---|
| The method proposed | 1475.45 | 0 | 95.79 | 24.88 | 1596.12 |
| WU | 1337.92 | 220.65 | 180.44 | 0 | 1739.01 |
| RO | 1477.16 | 0 | 94.08 | 66.20 | 1637.44 |
| SP | 1344.81 | 0 | 178.70 | 14.63 | 1538.14 |

Figure 8:
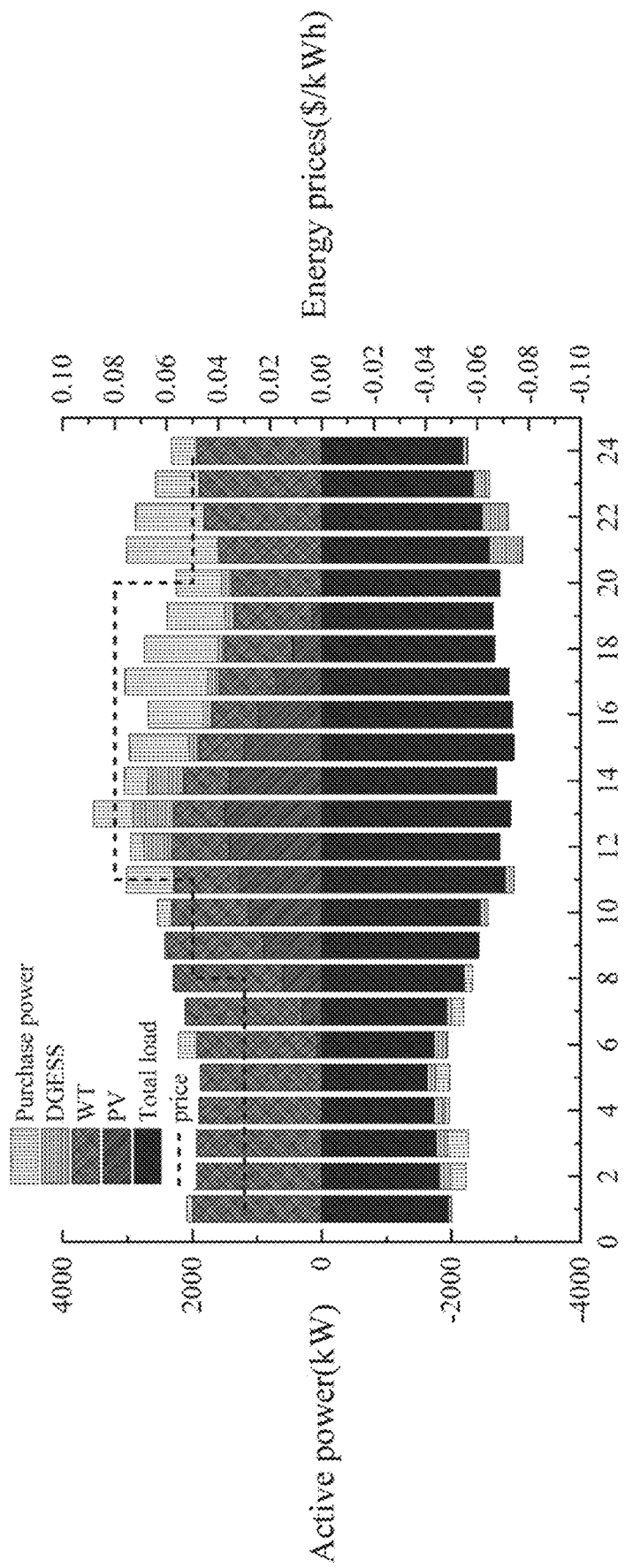
FIG. 8 is a diagram showing active power balance in the distribution network in simulation testing according to one embodiment.
Figure 9A:
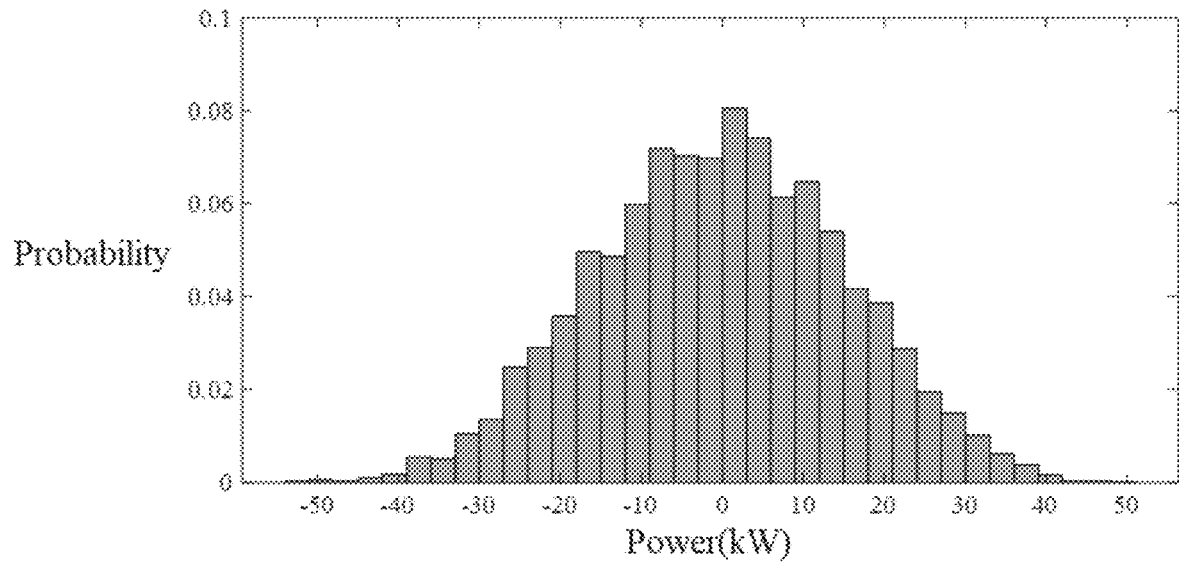
FIGS. 9A-9B show the real-time power adjustment distribution of different AESS units at time t=8 in simulation testing according to one embodiment, where.
Figure 9B:
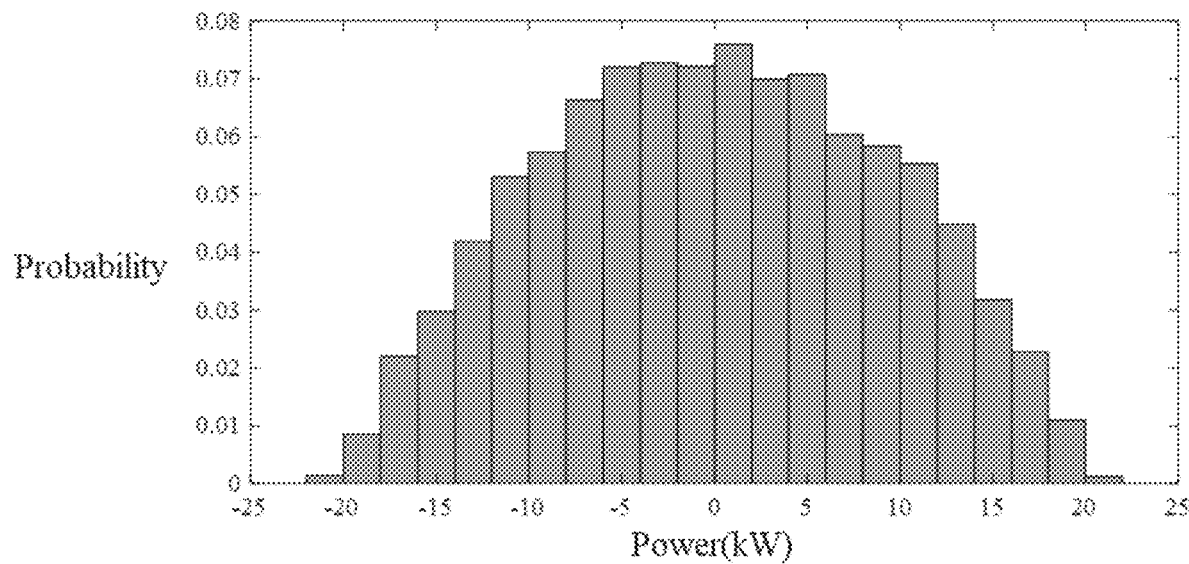

FIG. 8 illustrates the day-ahead scheduling results of various resources within the distribution network. As shown in FIG. 8, AESSs charge during low electricity price periods and discharge during high electricity price periods, indicating that AESSs not only enable the complete absorption of renewable energy but also engage in arbitrage by leveraging electricity price differentials. Furthermore, to better understand the mechanism of mitigating real-time fluctuations in renewable energy output and to ensure complete renewable absorption, Table 2 presents the power adjustment allocation factors of DGESS aggregators at time t=8. As can be seen from the table, each instance of renewable output fluctuation (i.e., deviations between actual and forecasted renewable generation $\delta$) is mitigated by one or more DGESS aggregators. For example, $\delta_1$ is entirely mitigated by AESS 4, while $\delta_4$ is jointly mitigated by AESS 5 and AESS 9, thereby achieving full renewable integration. FIGS. 9A-9B present the real-time power adjustment behaviors of AESS 5 and AESS 9 at time t=8. It is evident from FIGS. 9A-9B that the larger the real-time power adjustment allocation factor of an AESS, the wider the range of its power adjustment in real-time.

TABLE 2

The power adjustment allocation factor of DGESS aggregators (t = 8)

| D8 | $\delta_1$ | $\delta_2$ | $\delta_3$ | $\delta_4$ | $\delta_5$ | $\delta_6$ | $\delta_7$ | $\delta_8$ | $\delta_9$ |
|---|---|---|---|---|---|---|---|---|---|
| AESS 1 | 0 | 0 | 0 | 0 | 0.04 | 0.06 | 0.29 | 0 | 0 |
| AESS 2 | 0 | 0 | 0 | 0 | 0 | 0.49 | 0 | 0 | 0 |
| AESS 3 | 0 | 0 | 0 | 0 | 0 | 0 | 0.2 | 0 | 0.34 |
| AESS 4 | 0 | 0 | 0 | 0 | 0 | 0 | 0 | 0 | 0.52 |
| AESS 5 | 1 | 1 | 1 | 0.47 | 0 | 0 | 0.51 | 0 | 0.14 |

TABLE 2-continued

The power adjustment allocation factor of DGESS aggregators (t = 8)

| D8 | $\delta_1$ | $\delta_2$ | $\delta_3$ | $\delta_4$ | $\delta_5$ | $\delta_6$ | $\delta_7$ | $\delta_8$ | $\delta_9$ |
|---|---|---|---|---|---|---|---|---|---|
| AESS 6 | 0 | 0 | 0 | 0 | 0.92 | 0 | 0 | 0 | 0 |
| AESS 7 | 0 | 0 | 0 | 0 | 0 | 0 | 0 | 0 | 0 |
| AESS 8 | 0 | 0 | 0 | 0 | 0.03 | 0 | 0 | 1 | 0 |
| AESS 9 | 0 | 0 | 0 | 0.53 | 0.01 | 0.45 | 0 | 0 | 0 |

TABLE 3

The overall operating cost of the DN under different prediction errors

| Maximum deviation $\delta_{max}$ | Energy purchasing cost ($) | AESSs day-ahead regulation cost ($) | AESSs real-time regulation VaR (95%) ($) | Total cost ($) |
|---|---|---|---|---|
| 2% | 1292.59 | 219.92 | 4.75 | 1517.25 |
| 4% | 1324.09 | 202.44 | 9.83 | 1536.36 |
| 6% | 1368.50 | 172.11 | 13.76 | 1554.36 |
| 8% | 1410.18 | 145.67 | 17.96 | 1573.81 |
| 10% | 1475.45 | 95.79 | 24.88 | 1596.12 |

To further analyze the impact of renewable generation forecast errors on the economic performance of the distribution network, Table 3 presents the total operating cost of the distribution network and its components under different maximum forecast deviations. As shown in Table 3, the total operating cost of the distribution network increases with the magnitude of renewable generation fluctuations. Specifically, lower forecasting accuracy implies that DGESS aggregators must provide a higher level of flexibility to accommodate fluctuations in renewable output, which in turn reduces their profits from arbitrage based on electricity price differentials in the day-ahead market. Consequently, increased forecast errors result in higher electricity purchase costs, reduced day-ahead regulation costs for AESSs, and increased real-time regulation costs. When the maximum forecast deviation exceeds a certain threshold, the existing DGESS resources become insufficient to fully absorb the uncertainties introduced by renewable output fluctuations, making it difficult to achieve complete renewable energy integration. Therefore, to fully leverage the advantages of the proposed method, the flexibility provided by DGESS should be maintained above a certain level.

The technical features of the above-described embodiments may be arbitrarily combined. For the sake of brevity, all possible combinations of technical features in the embodiments have not been exhaustively described; however, as long as such combinations do not conflict, they shall be deemed to fall within the scope described in this specification.

The embodiments described above merely illustrate several possible implementations of the present application and are provided in a detailed and specific manner, but should not be construed as limiting the scope of the present patent application. It should be noted that those skilled in the art may make various modifications and improvements without departing from the spirit and scope of the present application. Therefore, the scope of protection of this application shall be determined by the appended claims.

What is claimed is:

1. A generalized energy storage regulation method for a full accommodation of renewable energy in distribution networks, comprising:
   acquiring a pre-constructed energy storage regulation model, wherein the energy storage regulation model comprises a target dispatch expression and power constraint conditions corresponding to the target dispatch expression;
   determining regulation parameters of an energy storage aggregation system based on the power constraint conditions and the target dispatch expression;
   determining an aggregate output curve of the energy storage aggregation system based on the regulation parameters, wherein the aggregate output curve represents a fitted relationship between an output of the energy storage aggregation system and time;
   decomposing the aggregate output curve to determine a respective decomposed output curve for each individual energy storage system within the energy storage aggregation system; and controlling each energy storage system to output power according to its corresponding decomposed output curve;
   wherein a determination of the energy storage regulation model comprises:
   determining an initial dispatch expression based on an expected cost of power purchase and sale in the distribution network and an expected power regulation cost of the energy storage aggregation system; wherein the expected cost of power purchase and sale is determined by a power purchase price from a main grid, a power selling price, and an amount of electricity purchased; and the expected power regulation cost is determined by a regulation cost coefficient and the output power of the energy storage aggregation system;
   determining power constraint conditions corresponding to the initial dispatch expression based on safe operation constraints of the distribution network, operational constraints of the energy storage aggregation system, and reactive power output constraints of wind and photovoltaic energy;
   performing an equivalent transformation based on the initial dispatch expression and the corresponding power constraint conditions to establish the energy storage regulation model.

2. The method according to claim 1, wherein a step of determining the operational constraints of the energy storage aggregation system comprises:
   obtaining technical parameters of each energy storage system;
   for each energy storage system, constructing an energy storage expression based on its corresponding technical parameters;
   aggregating the energy storage expressions of all the energy storage systems to obtain an aggregated energy storage expression;
   determining the operational constraints of the energy storage aggregation system based on the aggregated energy storage expression.

3. The method according to claim 2, wherein the technical parameters comprise self-discharge efficiency, charging and discharging time intervals, output power, charging power, discharging power, ramp rate, and capacity boundaries;
   for each energy storage system, constructing the energy storage expression based on its technical parameters comprises: constructing a power constraint expression based on a maximum charging power and a maximum discharging power;

constructing a ramp rate constraint expression based on the output power and the ramp rate;
constructing a state of charge (SOC) expression based on the self-discharge efficiency, charging and discharging time intervals, output power, ambient temperature influence factor, and ambient temperature;
constructing a SOC constraint expression based on the capacity boundaries;
determining the energy storage expression of the energy storage system based on the power constraint expression, ramp rate constraint expression, SOC expression, and SOC constraint expression.

4. The method according to claim 2, wherein aggregating the energy storage expressions to obtain the aggregated energy storage expression comprises:
determining a base polyhedron, the base polyhedron being determined based on the technical parameters corresponding to each of the energy storage expressions;
for each energy storage expression, determining a scaling factor and a translation factor;
determining an approximate fitting expression of each energy storage expression based on the base polyhedron, the corresponding scaling factor, and the corresponding translation factor;
obtaining the aggregated energy storage expression based on all the approximate fitting expressions.

5. The method according to claim 2, wherein the aggregated energy storage expression at least comprises an aggregated power constraint expression, an aggregated ramp rate constraint expression, and an aggregated SOC constraint expression;
determining the operational constraints of the energy storage aggregation system based on the aggregated energy storage expression comprises:
obtaining an aggregated scaling factor and an aggregated translation factor;
determining aggregated technical parameters of the aggregated power constraint expression based on the aggregated scaling factor, the aggregated translation factor, average charging power of the energy storage aggregation system, and average discharging power of the energy storage aggregation system;
determining the aggregated technical parameters of the aggregated ramp rate constraint expression based on the aggregated scaling factor, the aggregated translation factor, and average ramp rate of the energy storage aggregation system;
determining the aggregated technical parameters of the aggregated SOC constraint expression based on the aggregated scaling factor, the aggregated translation factor, and average SOC boundary of the energy storage aggregation system;
determining the operational constraints of the energy storage aggregation system based on the aggregated energy storage expression with determined aggregated technical parameters.

6. The method according to claim 1, wherein decomposing an aggregated output curve to determine a respective decomposed output curve for each energy storage system in the energy storage aggregation system comprises:
obtaining a scaling factor and a translation factor for each energy storage system;
decomposing the aggregated output curve based on the respective scaling factor and translation factor of each energy storage system, to determine the decomposed output curve for each energy storage system in the energy storage aggregation system.

7. A generalized energy storage regulation system for a full consumption of renewable energy in distribution networks, comprising: a processor with memory configure to:
an acquisition module, to obtain a pre-constructed energy storage regulation model, wherein the energy storage regulation model comprises a target dispatch expression and power constraint conditions corresponding to the target dispatch expression, the target dispatch expression being a model configured to determine output parameters of an energy storage aggregation system;
a processing module, to obtain regulation parameters of the energy storage aggregation system based on the power constraint conditions and the target dispatch expression;
a curve determination module, to determine an aggregated output curve of the energy storage aggregation system based on the regulation parameters of the energy storage aggregation system, wherein the aggregated output curve is a curve representing a fitted relationship between an output of the energy storage aggregation system and time;
a decomposition module, to decompose the aggregated output curve to determine a respective decomposed output curve for each energy storage system in the energy storage aggregation system, wherein each energy storage system outputs power according to its respective decomposed output curve;
wherein the acquisition module is further determine an initial dispatch expression based on the expected cost of power purchase and sale in the distribution network and an expected power regulation cost of the energy storage aggregation system; wherein the expected cost of power purchase and sale is determined by a power purchase price from a main grid, a power selling price, and an amount of electricity purchased;
the expected power regulation cost is determined by a regulation cost coefficient and an output power of the energy storage aggregation system;
the power constraint conditions corresponding to the initial dispatch expression are determined based on safe operation constraints of the distribution network, operational constraints of the energy storage aggregation system, and reactive power output constraints of wind and photovoltaic generation;
the energy storage regulation model is determined by performing an equivalent transformation based on the initial dispatch expression and the corresponding power constraint conditions.

8. The system according to claim 7, wherein the acquisition module is further configured to obtain technical parameters of each energy storage system;
construct an energy storage expression for each energy storage system based on its technical parameters;
aggregate all the energy storage expressions to obtain an aggregated energy storage expression;
determine the operational constraints of the energy storage aggregation system based on the aggregated energy storage expression.

\* \* \* \* \*